Nov. 23, 1954 O. J. SUNDSTRAND 2,695,134

PRINTING CALCULATOR MECHANISM

Filed June 29, 1950 16 Sheets-Sheet 1

INVENTOR.
OSCAR J. SUNDSTRAND
BY Jesse A. Holton
ATTORNEY

Nov. 23, 1954 O. J. SUNDSTRAND 2,695,134

PRINTING CALCULATOR MECHANISM

Filed June 29, 1950 16 Sheets-Sheet 2

INVENTOR
OSCAR J. SUNDSTRAND
BY Jesse A. Holton
ATTORNEY

INVENTOR.
OSCAR J. SUNDSTRAND
BY Jesse A. Holton
ATTORNEY

Nov. 23, 1954 O. J. SUNDSTRAND 2,695,134

PRINTING CALCULATOR MECHANISM

Filed June 29, 1950 16 Sheets-Sheet 4

INVENTOR.
OSCAR J. SUNDSTRAND
BY Jesse A. Holton
ATTORNEY

INVENTOR.
OSCAR J. SUNDSTRAND
BY Jesse A. Holton
ATTORNEY

INVENTOR.
OSCAR J. SUNDSTRAND
BY Jesse A. Holton
ATTORNEY

INVENTOR.
OSCAR J. SUNDSTRAND
BY Jesse A. Holton
ATTORNEY

Nov. 23, 1954 O. J. SUNDSTRAND 2,695,134

PRINTING CALCULATOR MECHANISM

Filed June 29, 1950 16 Sheets-Sheet 8

INVENTOR.
OSCAR J. SUNDSTRAND
BY Jesse A. Holton
ATTORNEY

Nov. 23, 1954 O. J. SUNDSTRAND 2,695,134

PRINTING CALCULATOR MECHANISM

Filed June 29, 1950 16 Sheets-Sheet 9

INVENTOR.
OSCAR J. SUNDSTRAND
BY Jesse A. Holton
ATTORNEY

Nov. 23, 1954 O. J. SUNDSTRAND 2,695,134

PRINTING CALCULATOR MECHANISM

Filed June 29, 1950

16 Sheets-Sheet 10

INVENTOR.
OSCAR J. SUNDSTRAND

BY Jesse A. Holton

ATTORNEY

INVENTOR.
OSCAR J. SUNDSTRAND
BY Jesse A. Holton
ATTORNEY

Nov. 23, 1954 O. J. SUNDSTRAND 2,695,134

PRINTING CALCULATOR MECHANISM

Filed June 29, 1950

16 Sheets-Sheet 12

INVENTOR.
OSCAR J. SUNDSTRAND
BY Jesse A. Holton
ATTORNEY

INVENTOR.
OSCAR J. SUNDSTRAND
BY Jesse A. Holton
ATTORNEY

INVENTOR
OSCAR J. SUNDSTRAND
BY Jesse A. Holton
ATTORNEY

Nov. 23, 1954

O. J. SUNDSTRAND 2,695,134

PRINTING CALCULATOR MECHANISM

Filed June 29, 1950

16 Sheets-Sheet 15

INVENTOR.
OSCAR J. SUNDSTRAND
BY Jesse A. Holton
ATTORNEY

INVENTOR.
OSCAR J. SUNDSTRAND
BY Jesse A. Holton
ATTORNEY 2,695,134

PRINTING CALCULATOR MECHANISM

Oscar J. Sundstrand, Hartford, Conn., assignor to Underwood Corporation, New York, N. Y., a corporation of Delaware Application June 29, 1950, Serial No. 170,968

36 Claims. (Cl. 235—60.25)

Figure 1:
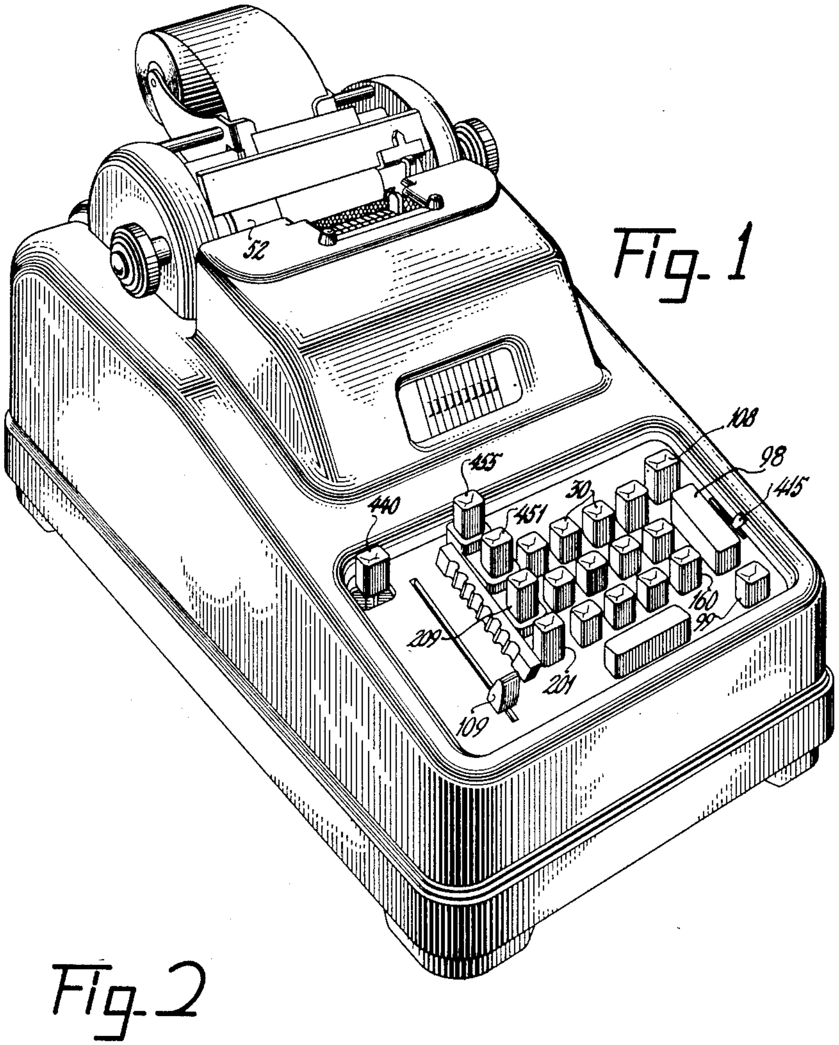

This invention relates to calculating machines and more particularly to a calculating machine capable of performing problems in multiplication or division and printing the results of said problems in addition to the usual functions of a printing adding-subtracting machine.

Such a machine is particularly useful in offices where the majority of operations of such a machine are simple adding-subtracting operations with occasionally a problem in multiplication or division to be determined. In all of such problems, the results of the computations must be automatically printed on a tape as a check on the accuracy of the operator and to eliminate the need of two distinct machines with a possibility of error in transcribing the answers from one of the machines.

It is therefore an object of this invention to develop a machine capable of solving problems in multiplication and division and capable of addition and subtraction operations involving both positive and negative balances, such a machine to be also operable to record for further reference, all factors involved in such computations.

It is also an object of the present invention to develop a machine capable of performing the four basic arithmetical operations and printing the results of such computations for reference purposes which machine shall utilize so far as possible, structure present in a standard adding-subtracting machine and shall therefore be comparatively simple and inexpensive to construct.

It is a further object to provide in a printing calculating machine, a multiplier set-up mechanism which is capable of being preset to determine the number of multiplying cycles to be performed by the machine.

It is also an object to provide in a printing calculating machine having an algebraic totalizer, mechanism automatically operable at the initiation of a division operation, to disable the usual "fugitive one" mechanism and so prevent inaccurate results due to the occurrence of a "negative zero" condition of the totalizer.

It is still another object of this invention to provide in a printing calculating machine, a mechanism operable to automatically stop a division operation and restore the machine to a normal condition upon the occurrence of an error as a result of an incorrect setting up of the factors of such a problem.

A still further object is to provide a mechanism capable of being set to prevent an automatic termination of a multiplication or division operation until the maximum number possible of multiplier or quotient digits have been made available.

Another object is to provide a computation extending key operable to determine with a negligible error, a full complement of quotient digits in a division problem or to permit use of a full complement of multiplier digits in a multiplication problem.

A further object is the provision of a manually settable control member to predetermine that after completion of a multiplication or division operation, either normal or extended, the register of the machine shall be automatically operated in a total taking cycle to control printing of the amount in the register as a multiplication product or division remainder.

Still another object is to provide a stop mechanism operable in multiplication or division operations to terminate the operation at the end of the cycle of operations in the particular denominational order in which computation is being effected when the mechanism is set.

Another object is the provision of mechanism combining the multiplication and division control mechanisms to enable the operator to preset the machine for termination of a division operation when a predetermined number of quotient digits have been recorded.

A still further provision is a decimal key operable to indicate the position of the decimal point in the multiplier or quotient digits.

Another further object is to provide a correction key operable to restore all multiplication and division control mechanisms to a normal, inactive condition when an error is discovered during solution of a problem.

With these and other incidental objects in view, the invention consists in certain novel features of construction and combinations of parts, a preferred embodiment of which is hereinafter described with reference to the accompanying drawings.

Figure 2:
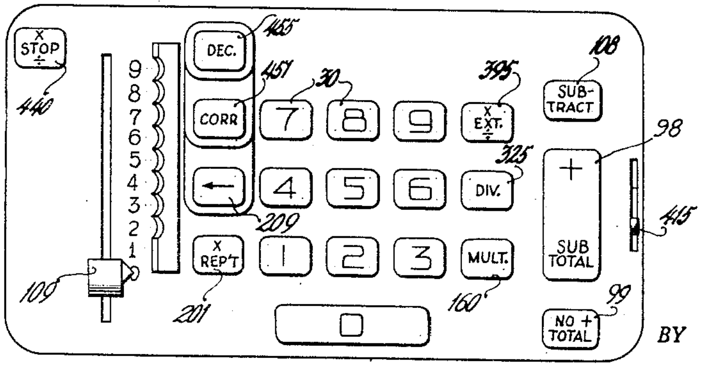
Figure 3:
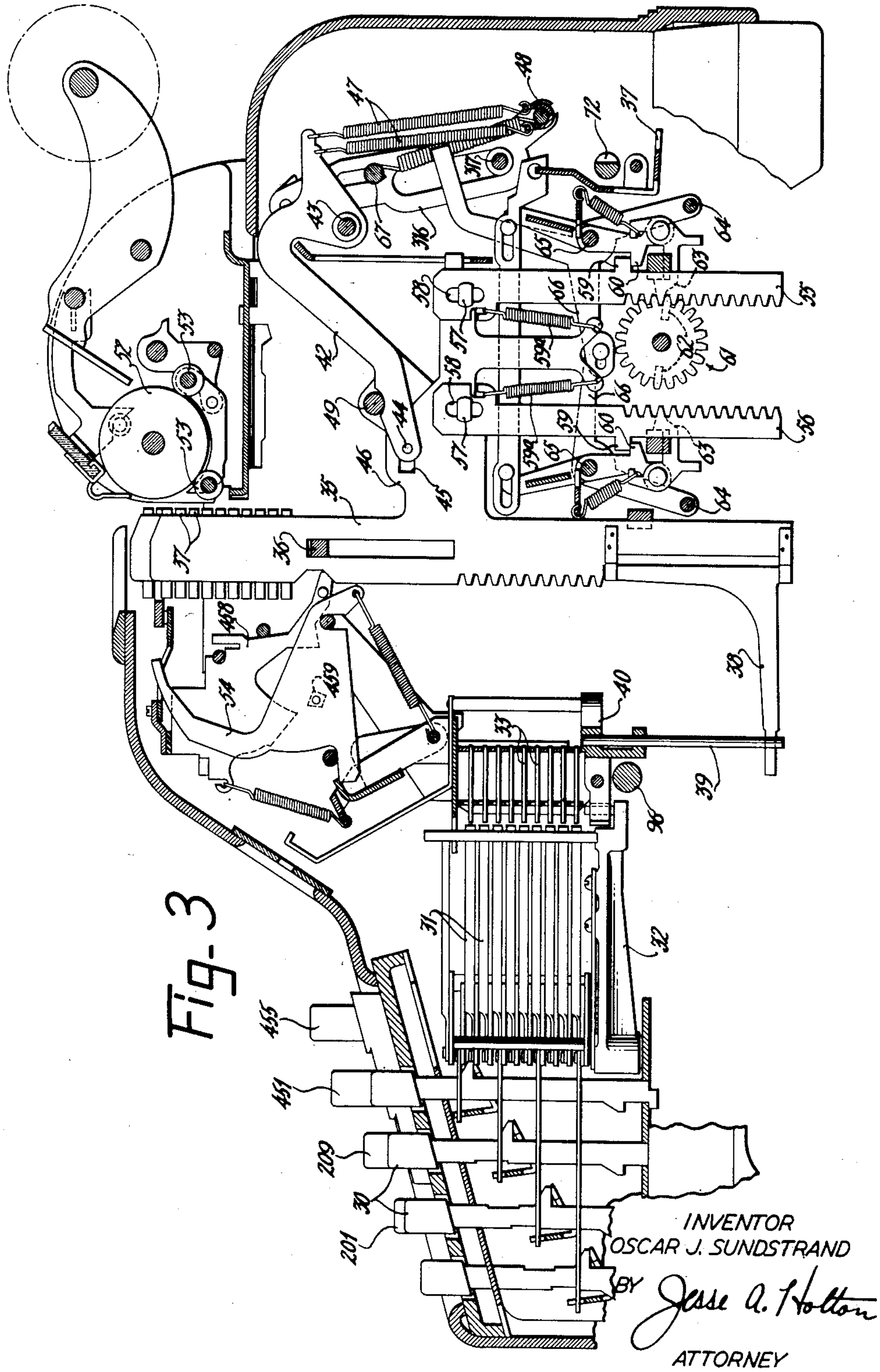
Figures 4, 5:
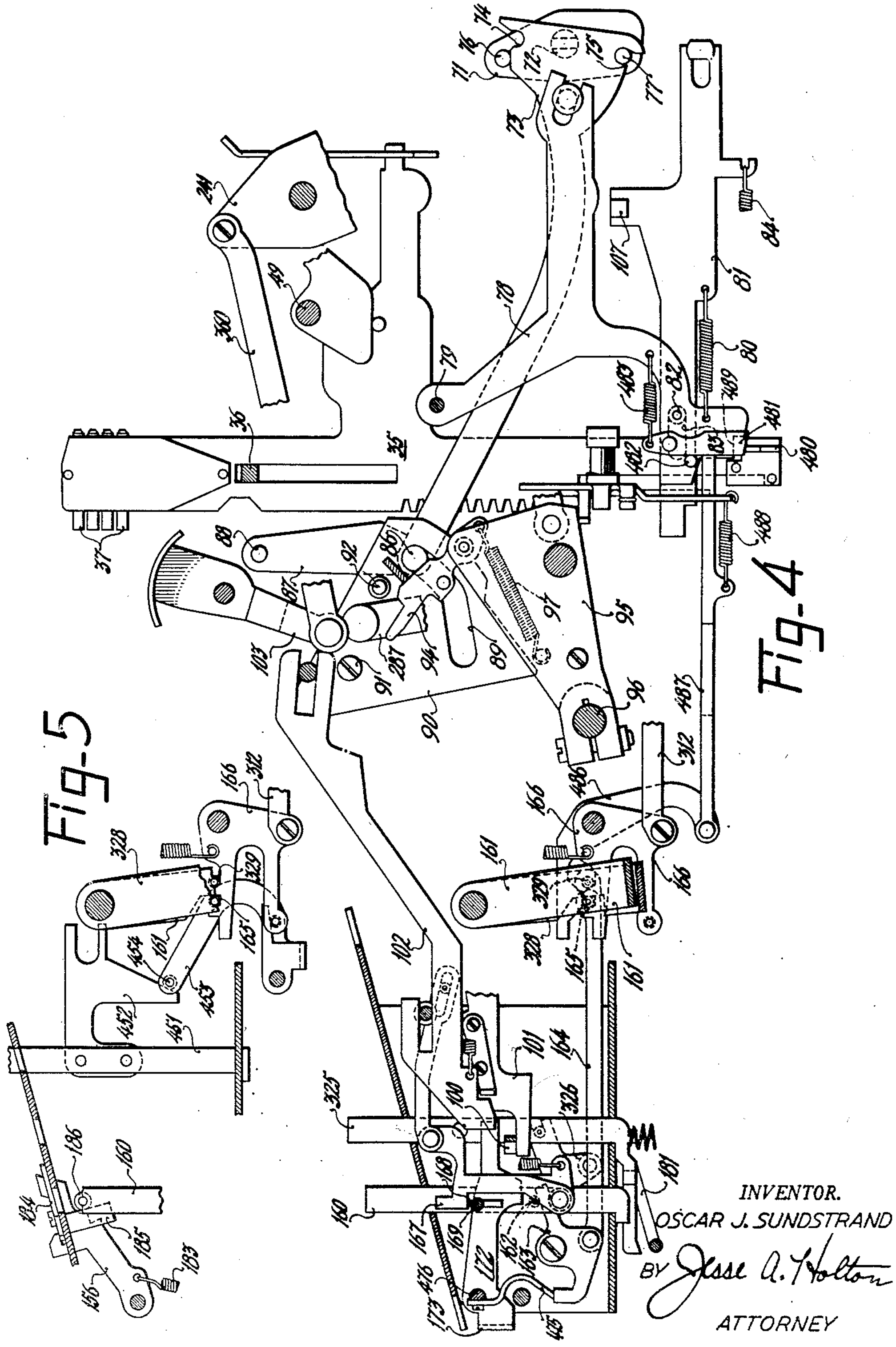
Figures 6, 7:
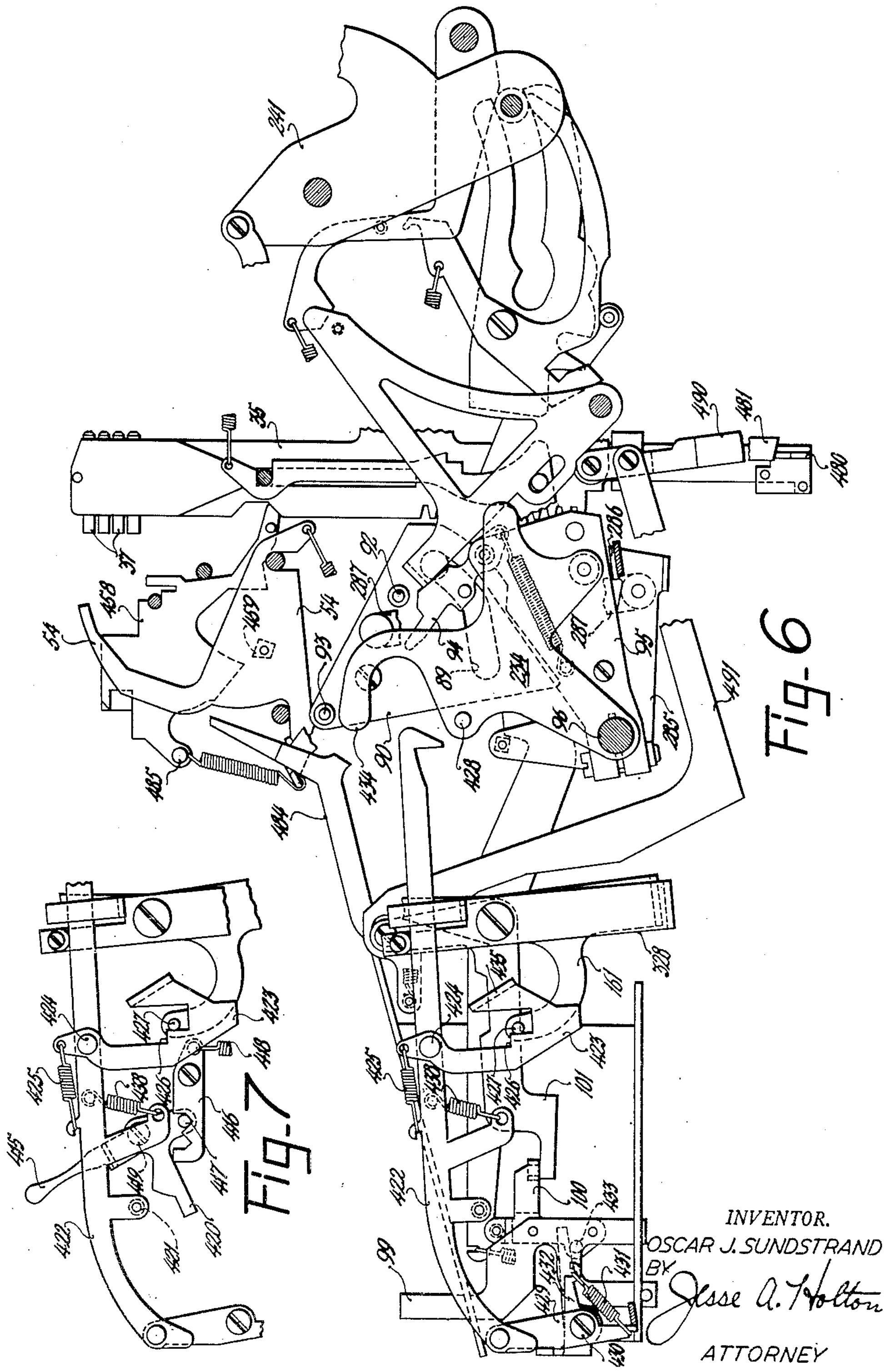
Figure 8:
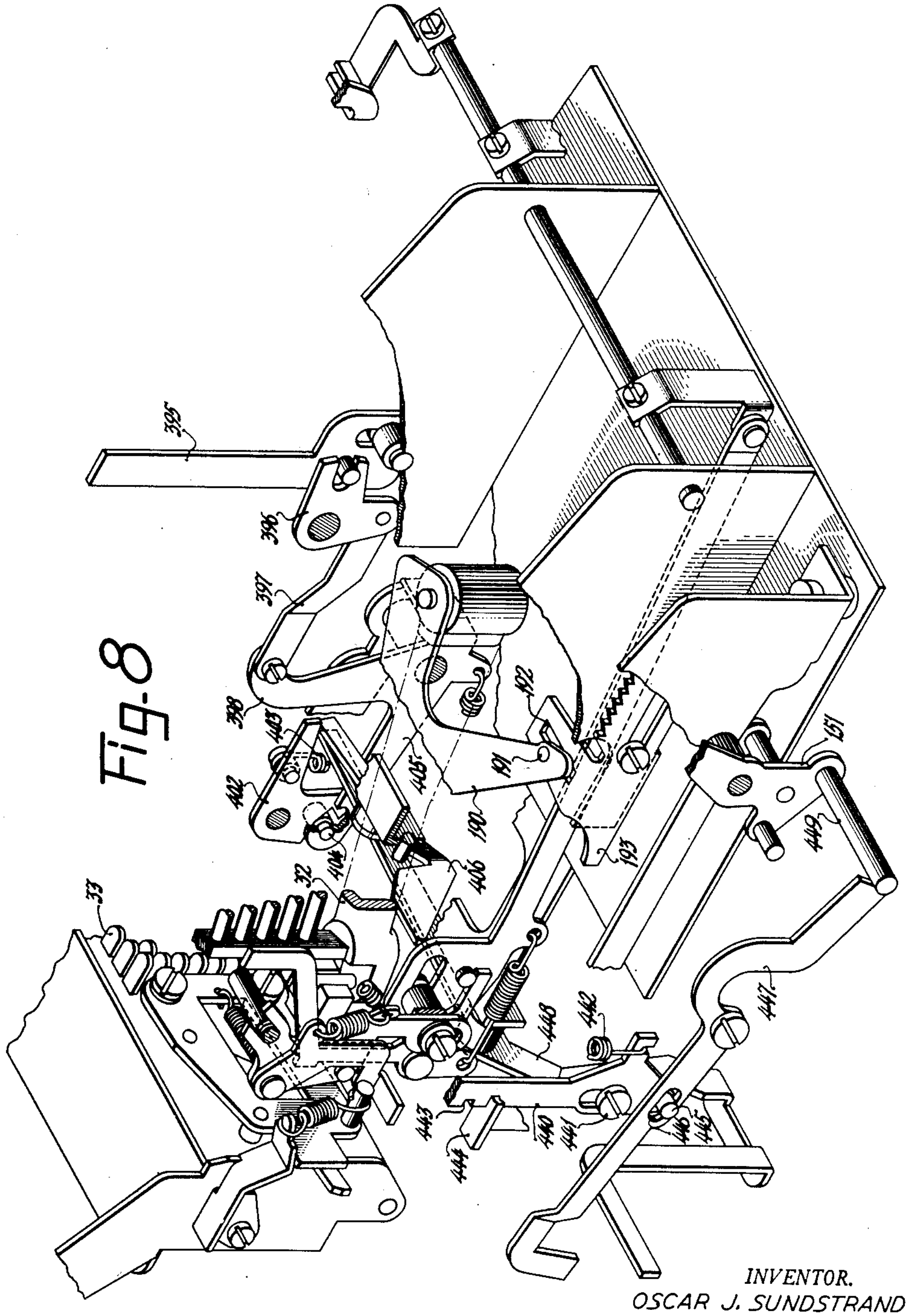
Figures 9, 10:
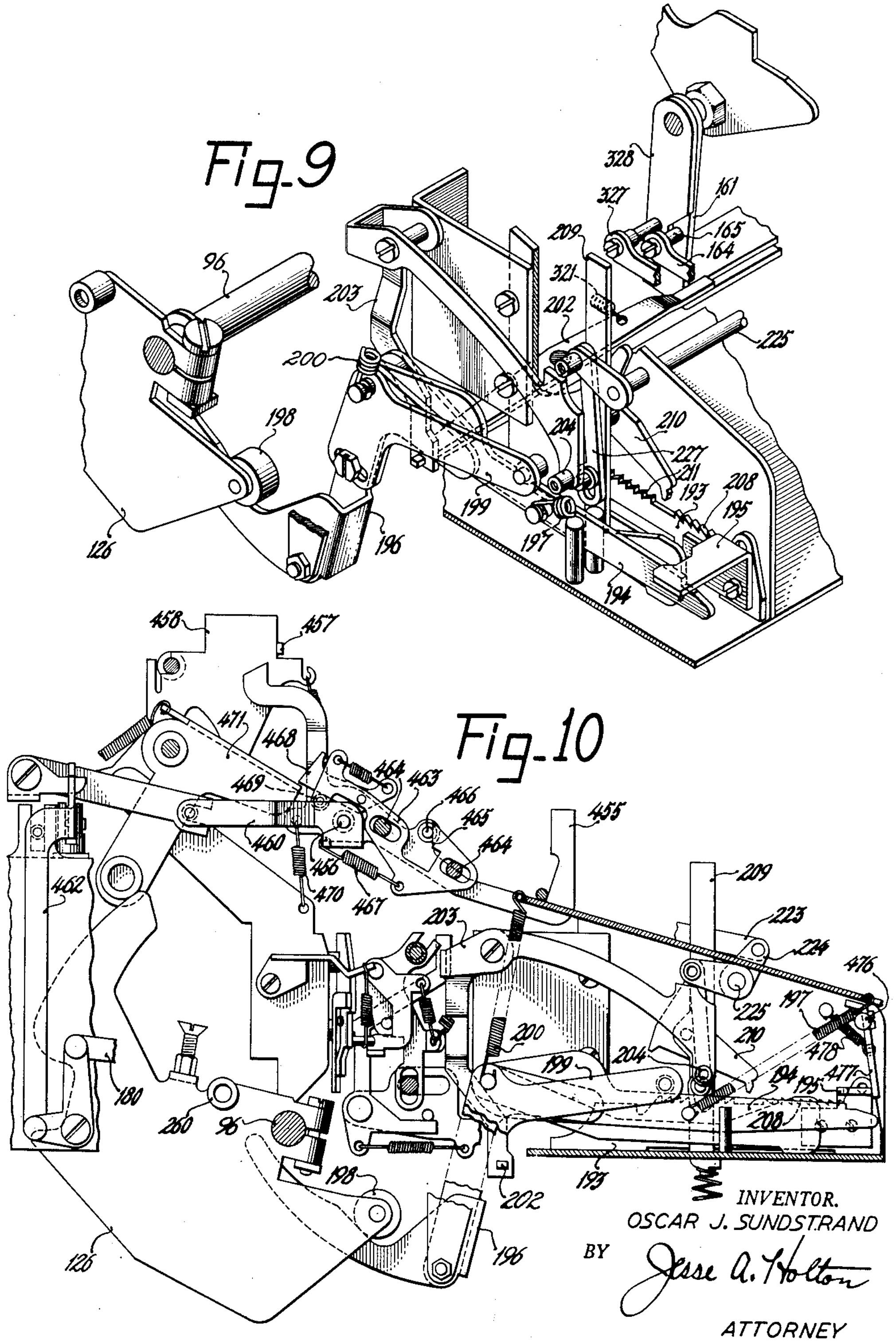
Figure 11:
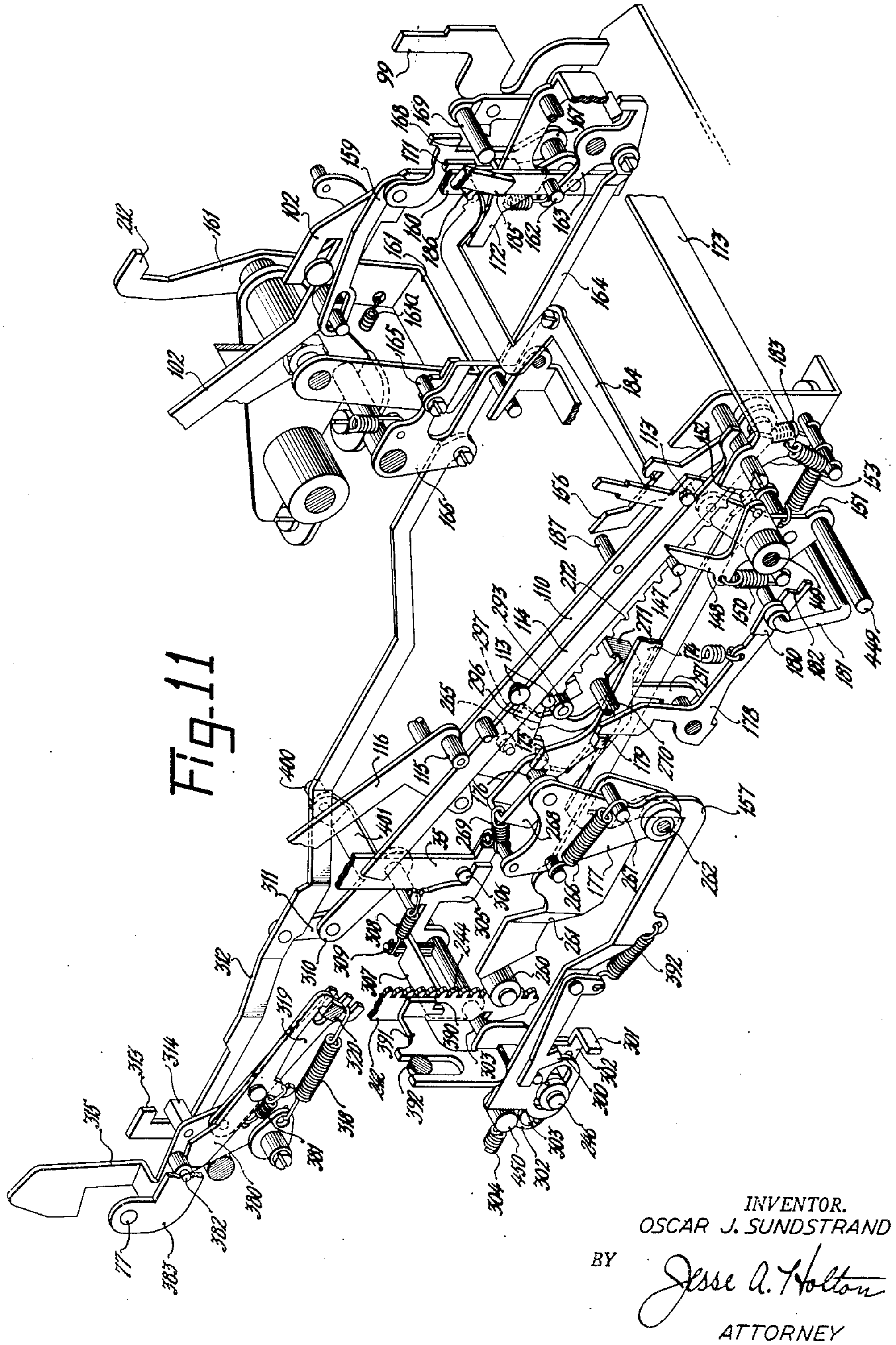
Figures 12, 13:
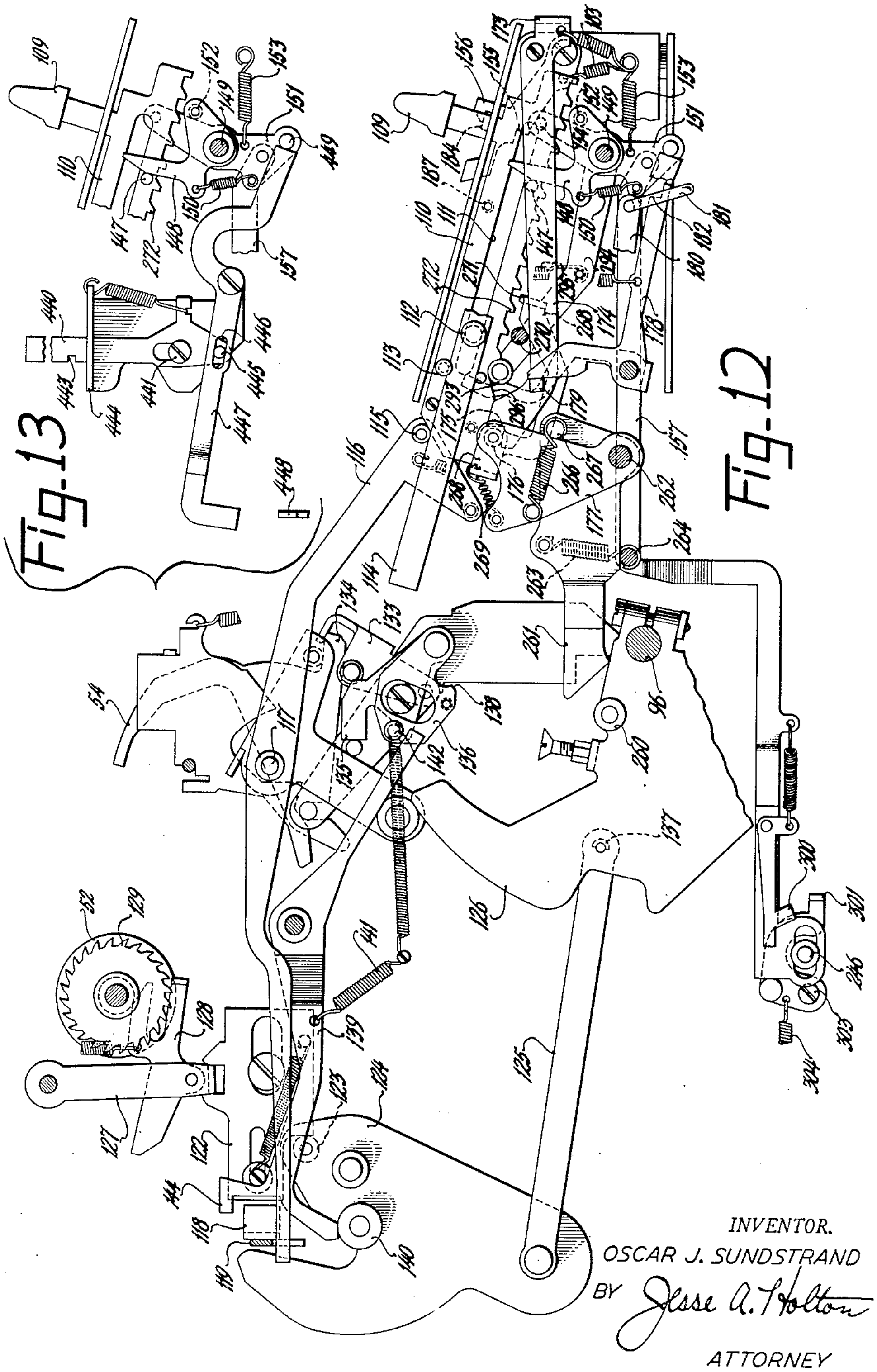
Figures 14, 15:
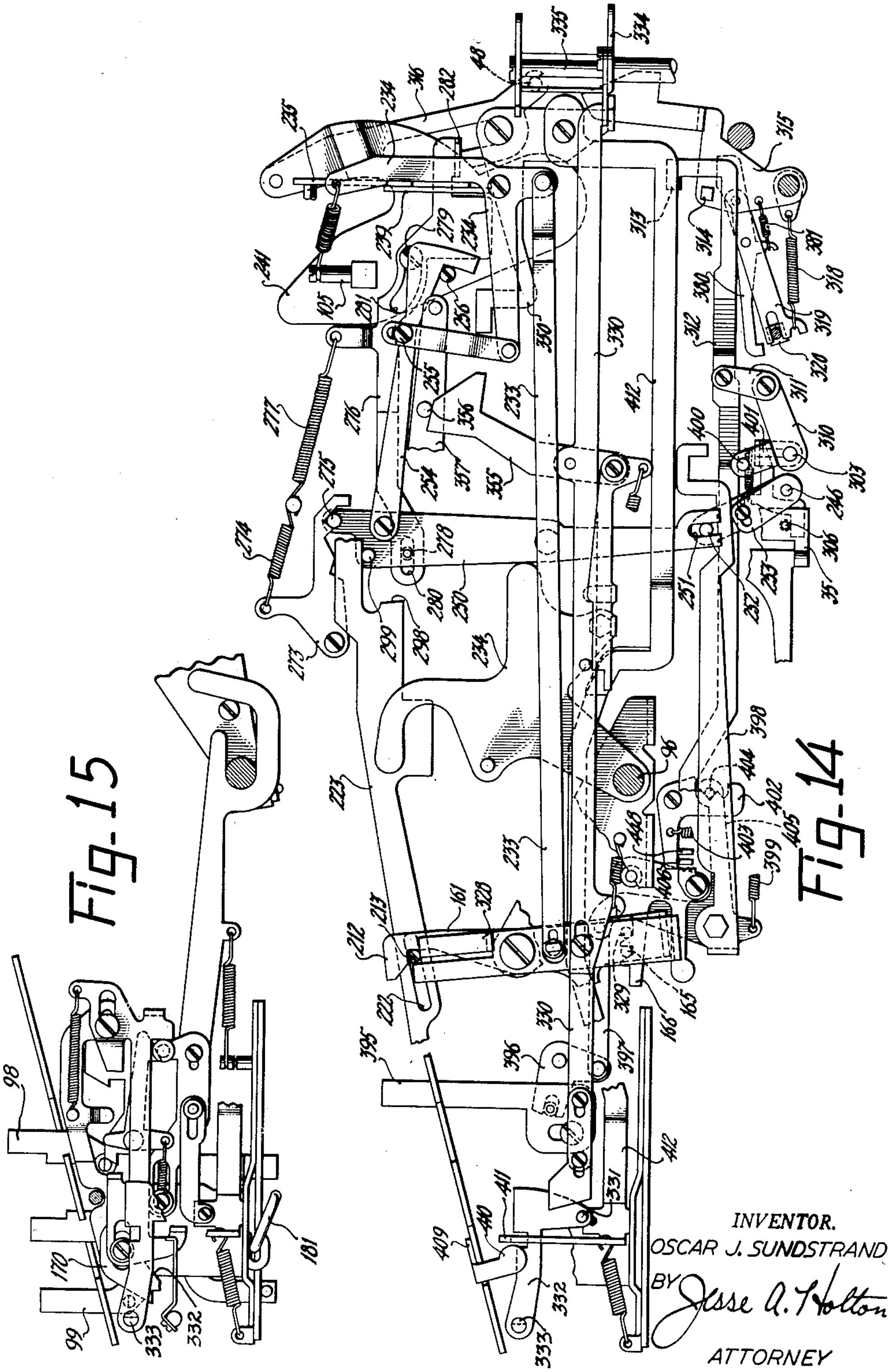
Figures 16, 17, 18:
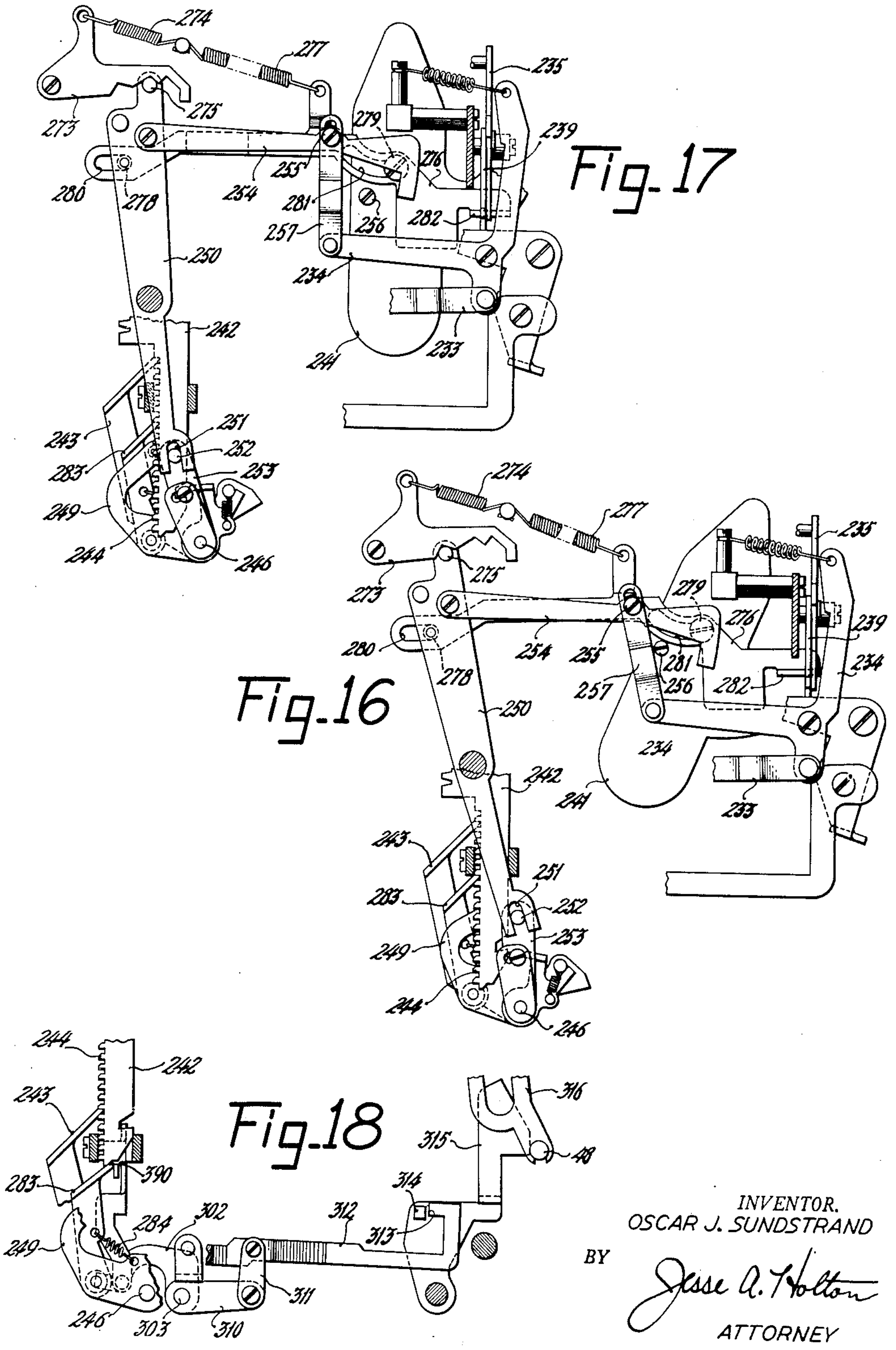
Figures 29, 30, 31:
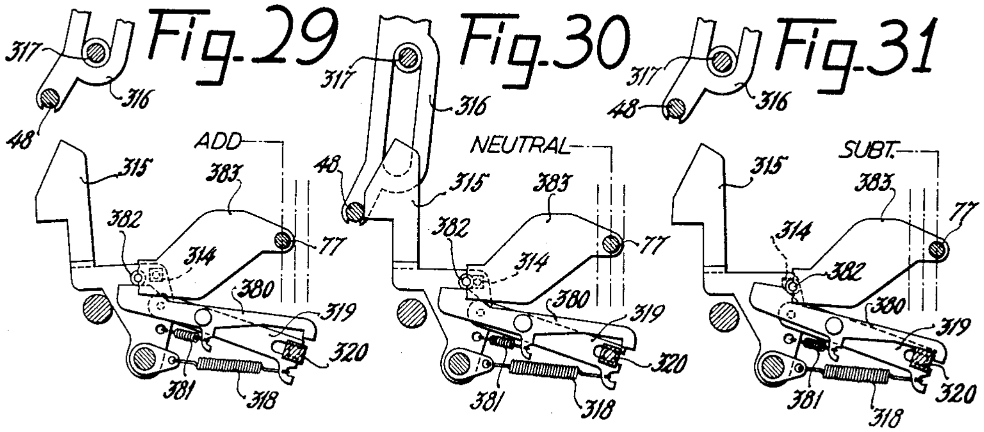
Figure 19:
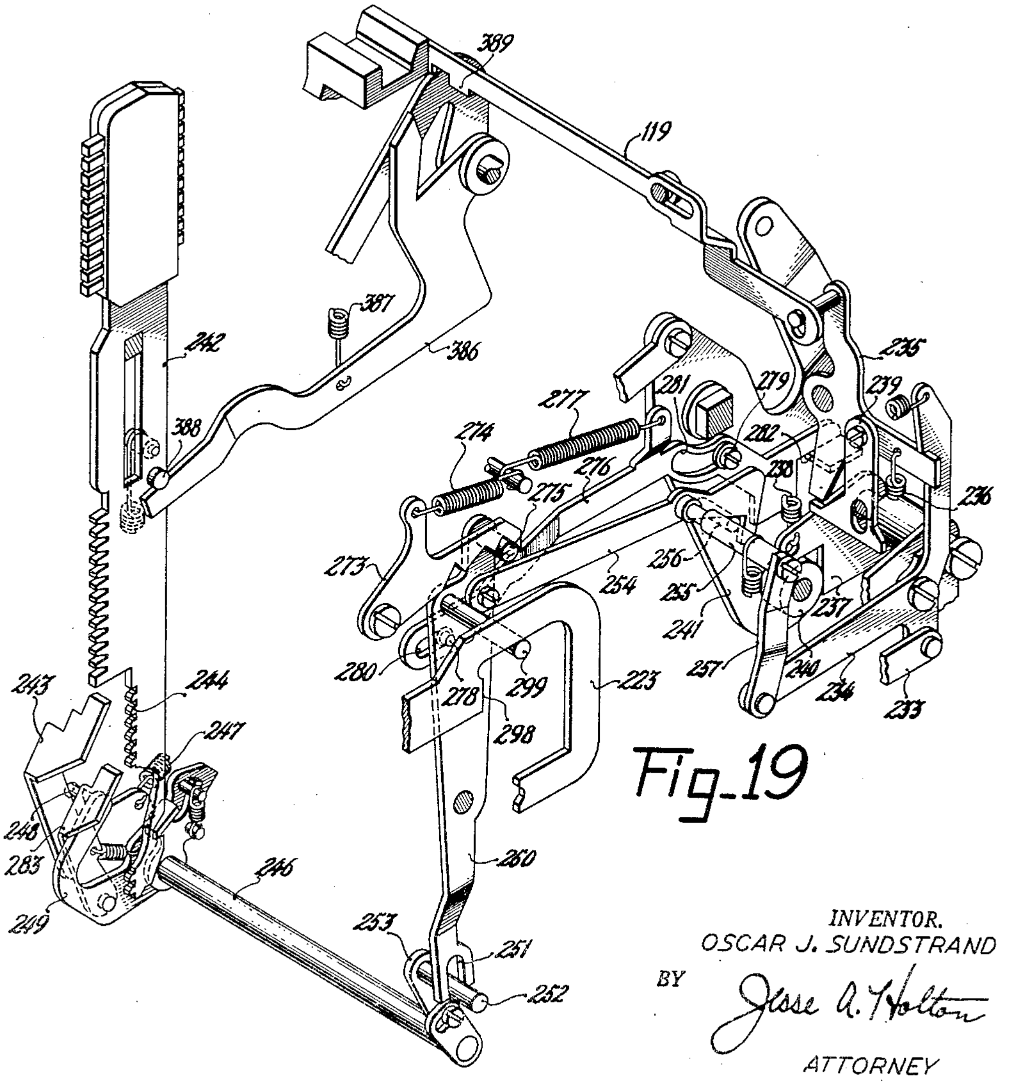
Figure 20:
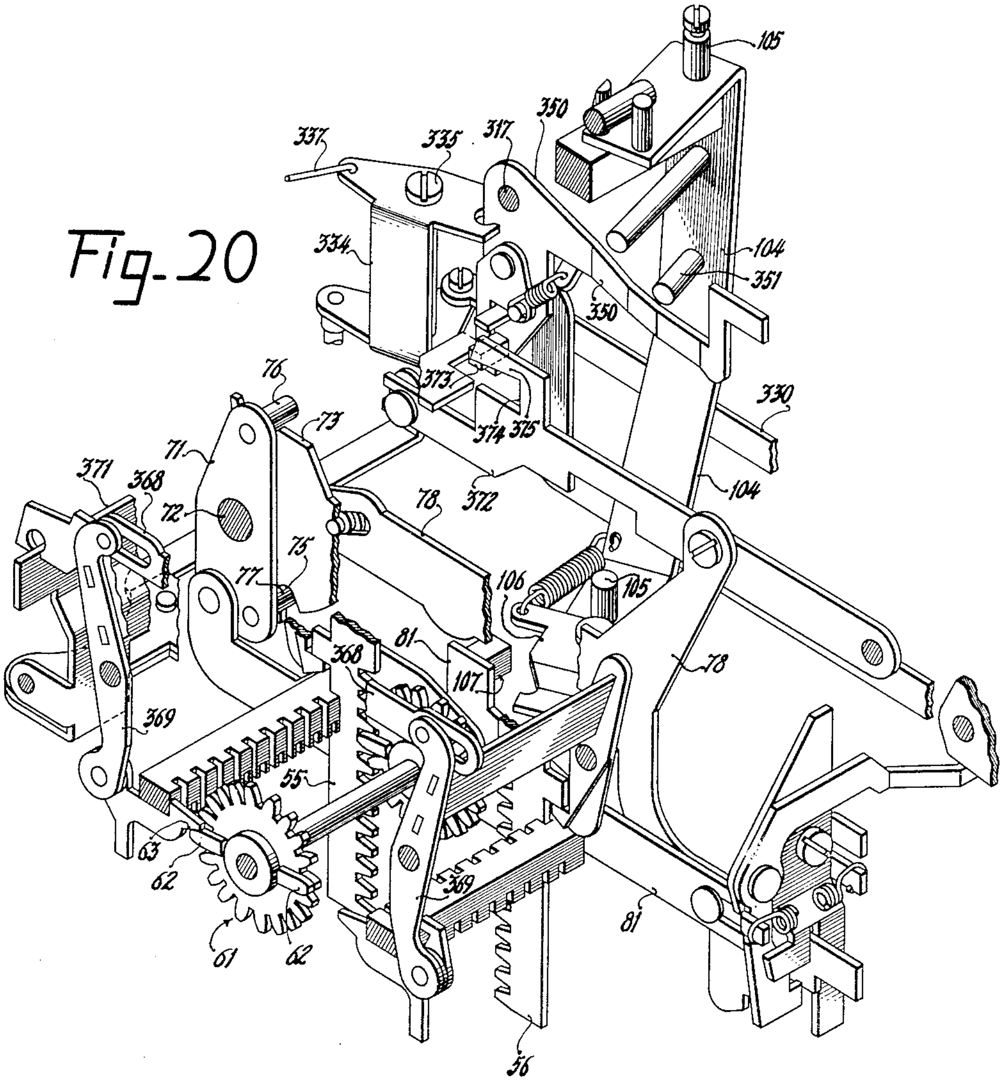
Figure 21:
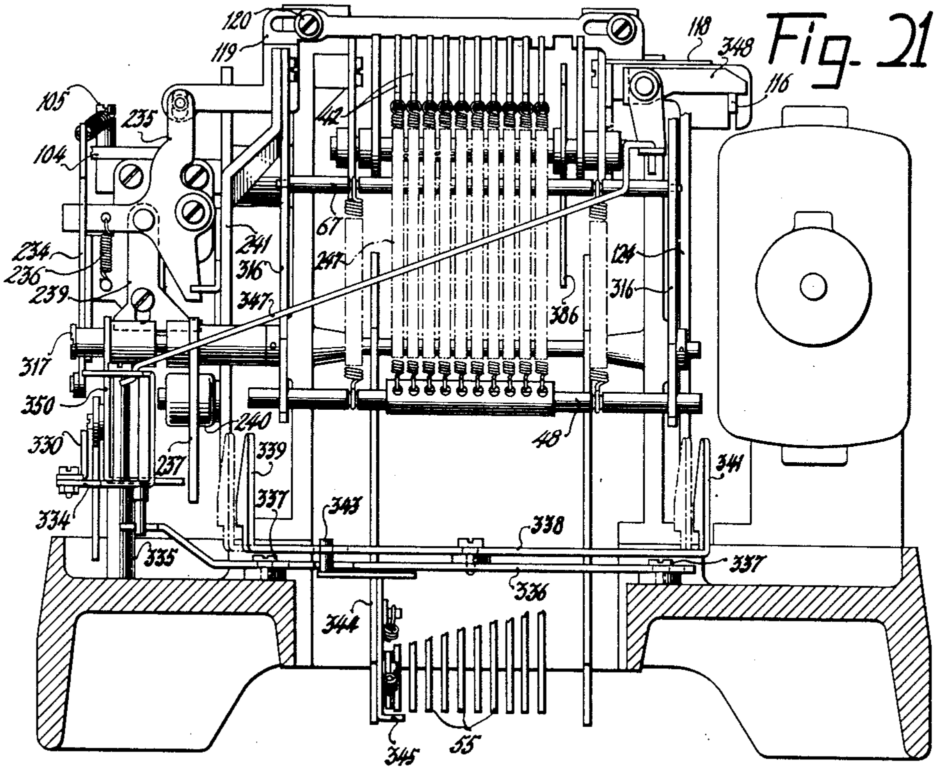
Figure 22:
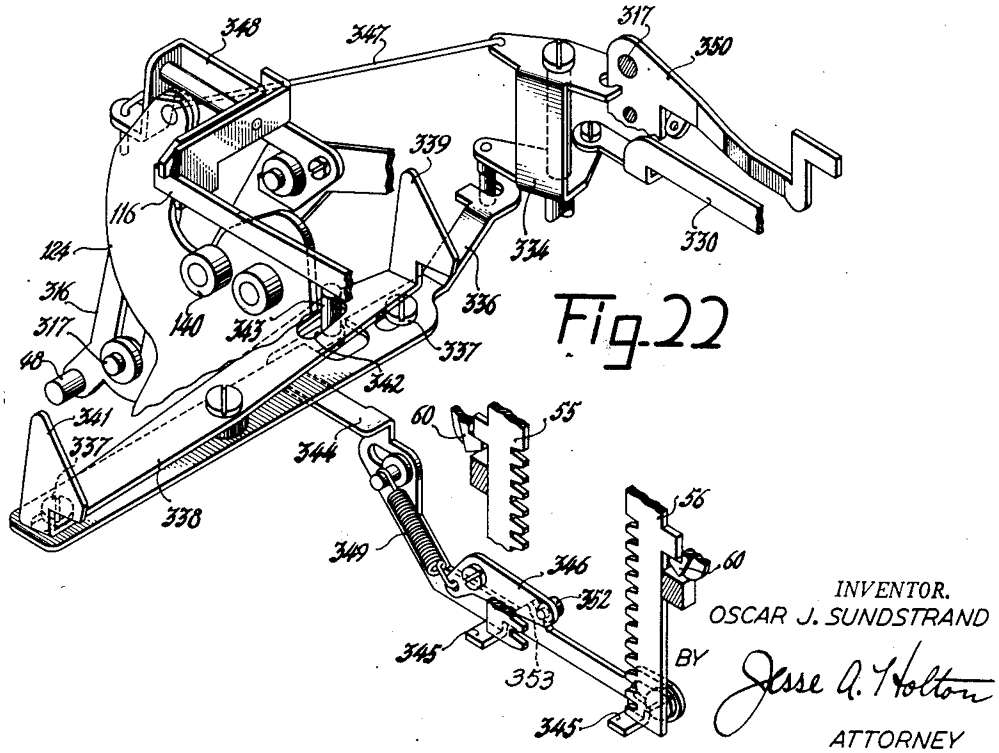
Figures 23, 24:
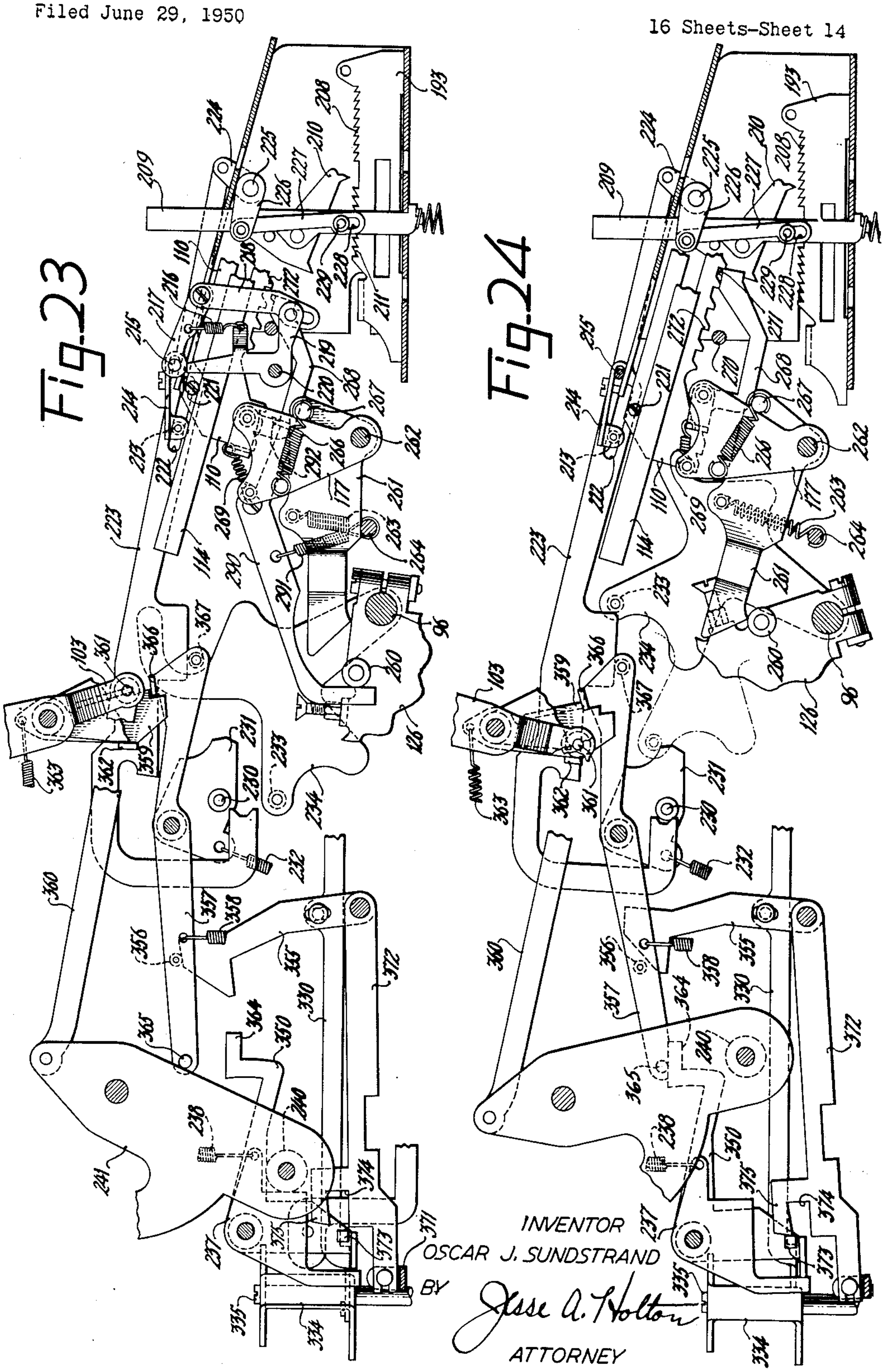
Figures 25, 26, 27:
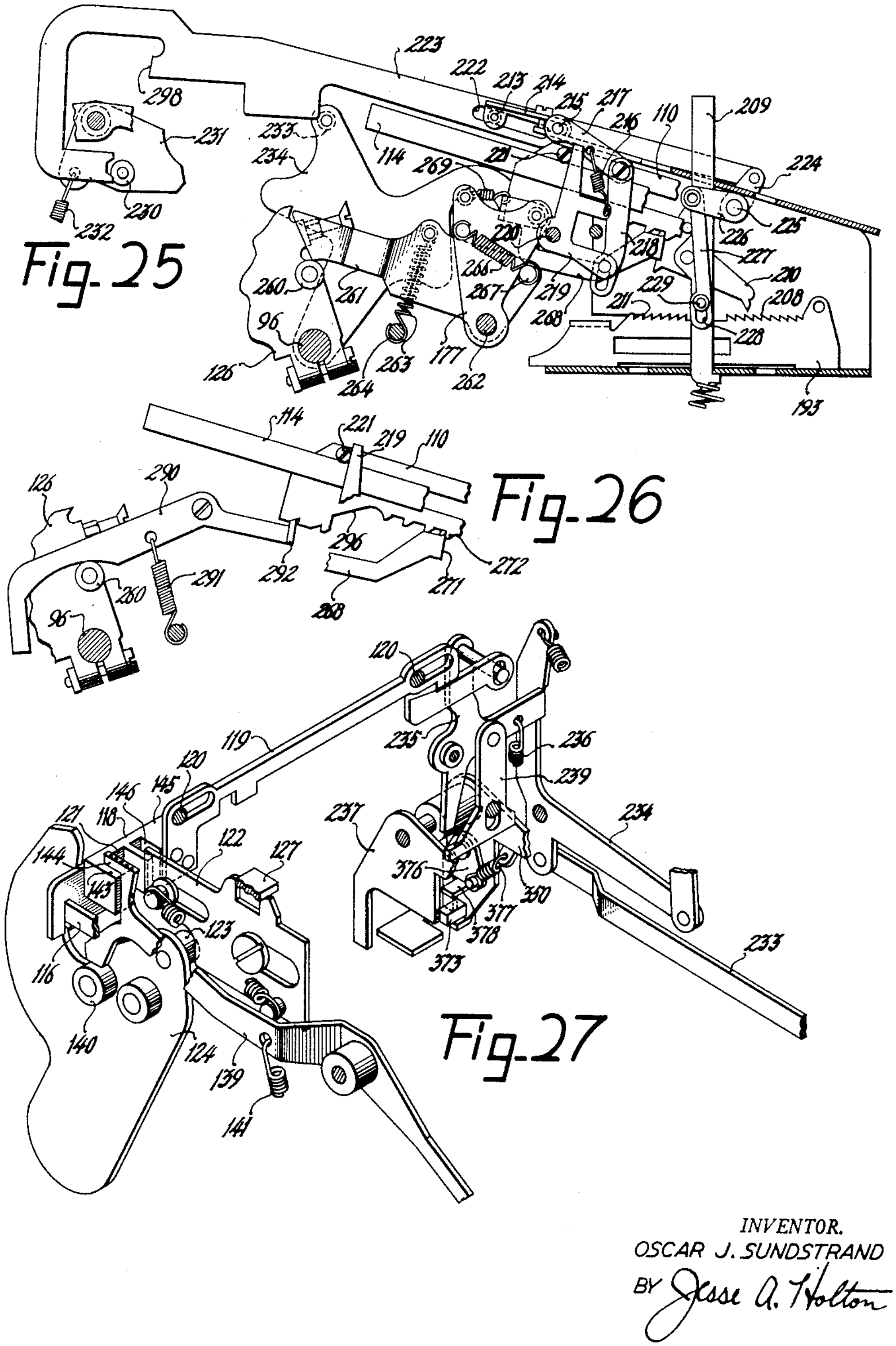
Figure 28:
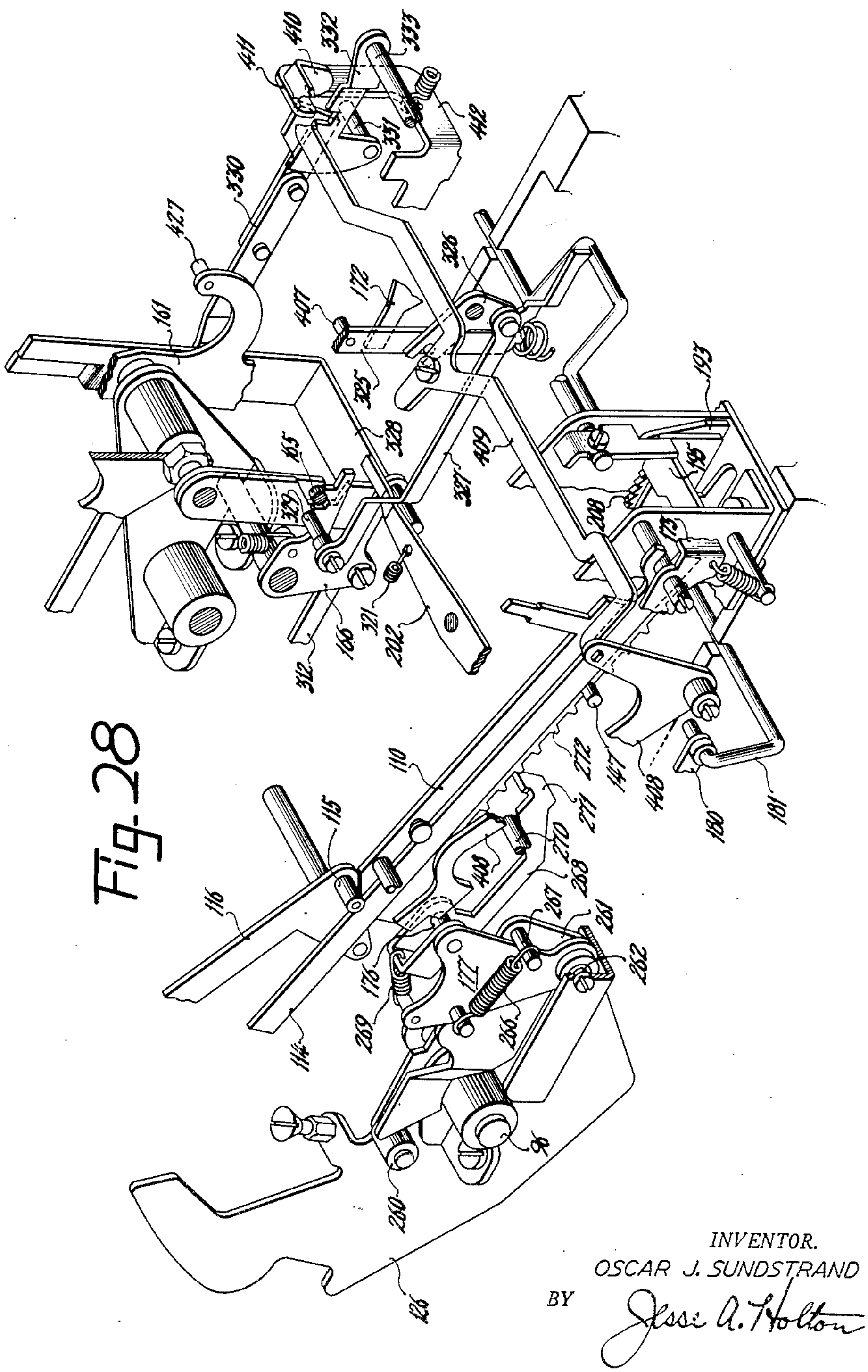

In the drawings:

Figure 1 is a general view showing the complete machine in its case,

Figure 2 is a layout view showing the positioning of the various keys in the keyobard, Figure 3 is a sectional view showing the basic adding machine mechanisms for setting up and entering values into the register, Figure 4 is a right side view showing the controls over the register for addition, subtraction and totals and the symbol printing mechanism, Figure 5 is a fragmentary view showing the release of the multiplication and division cradles by the correction key, Figure 6 is a right side view showing the conventional total taking mechanism, the automatic means to initiate a total taking operation after a multiplication or division computation and a part of the symbol printing mechanism, Figure 7 is a view of a part of Figure 6 and shows the member for predetermining whether an automatic total shall or shall not follow a multiplication or division operation, Figure 8 is a perspective showing of a part of the value set-up mechanism and the extended calculation key together with their relationship to each other, Figure 9 is a perspective view of the mechanism for disabling in multiplication and division operations the automatic value set-up restoring mechanism, Figure 10 is a left side view showing the value set-up restoring mechanism, the back space restoring means and the decimal point printing means, Figure 11 is a perspective view of the multiplication set-up controls and the automatic restoring mechanism for these controls, Figure 12 is a left side view showing the multiplier set-up slide and its controls together with the control of this member over the printing mechanism, Figure 13 is a fractional view illustrating the stop key and its relationship to the automatic stopping controls, Figure 14 is a right side view of the multiplication controls including the printing, counting and automatic stopping mechanisms, together with parts of the division control members, Figure 15 is a showing from the right side of the non-add-total and the add keys, Figure 16 shows the mechanism for advancing the counter bar during multiplication and division, the mechanism being in its operated state, Figure 17 is a view similar to Figure 16 but showing the parts in the condition assumed near the end of a cycle in the multiplication or division operation, Figure 18 is a view of a part of Figure 16 showing the parts in the position assumed when an error is determined by the machine, Figure 19 is a perspective showing of the counter bar mechanism shown in Figure 16, Figure 20 is a perspective view of some of the division mechanism, particularly, of the overdraft determining mechanism, Figure 21 is a rear view showing a part of the printing control members, Figure 22 is a perspective view showing the printing control structure and the "fugitive one" block out members for division operations, Figure 23 is a left side view of the structure involved in back spacing the value set-up mechanism during division operations, Figure 24 is a view similar to Figure 23 but showing the part in position to be operated, Figure 25 is a left side view of the back spacing mechanism utilized in the multiplication operation, Figure 26 is a detail showing of the latch to prevent a return of the multiplier slide from a sub-normal position to its "0" position until the end of the cycle, Figure 27 is a perspective showing of the mechanisms for controlling the printing and paper feeding parts during multiplication operations, Figure 28 is a perspective view of the structure utilized for a predetermined extended division operation, and Figures 29, 30 and 31 are detail views of the mechanism to prevent automatic termination of a division operation until the quotient digit has been fully determined.

*General description*

The machine of the present invention is intended for use where a machine capable of performing the operations of addition, subtraction, multiplication and division with all factors entering into the computation being printed on a record, is required. The basic machine illustrated in the present embodiment of the invention is the well-known, commercial Sundstrand adding machine. This Sundstrand machine is capable of addition, subtraction and automatic total or sub-total taking operations, including negative totals which are printed as the true negative total.

The Sundstrand adding machine has been modified by the addition of controls to enable multiplication to be performed by the method of repeated addition. The significant digits of the multiplicand are first entered on the usual ten key keyboard followed by the entry of a number of zeros one less than the number of digits in the multiplier. A multiplier slide is then set to the first multiplier digit and the multiplication key depressed. Operation of the multiplication key initiates first a non-add cycle and then a number of addition cycles equal to that set up by the multiplier slide. During the last of these cycles, the printing hammers are released to print the multiplier digit from a type bar which has been advanced one step per cycle and to print the multiplicand used for that multiplier digit. Near the end of such last cycle, the keyboard back space key is automatically operated to reduce the multiplicand by a factor of 10 and the machine cycling control is released to stop further cycling.

The multiplier slide which has been returned to the zero position during the preceding operations is next set to the second digit of the multiplier and the multiplication key again depressed to initiate a second series of cycles similar to the first series set out above. These operations are repeated for each succeeding digit of the multiplier except the last digit. During the last cycle of multiplication by the last multiplier digit, the back space operating mechanism is disabled and the set up clearing out mechanism is enabled to fully clear the multiplicand from the set up pins. Also during such last cycle, the total key may be operated to initiate an automatic total cycle during which the product of the multiplication is printed.

In addition to the above mechanism, a stop key is provided which when depressed will terminate multiplication as described above at the conclusion of the operation with the multiplier digit then being or thereafter entered. An extend key is also provided which will, when depressed, prevent termination of multiplication until the multiplicand has been entirely eliminated by operation of the back space mechanism as above described. This key will permit use of a large multiplicand or multiplier or both, the product of which is larger than the capacity of the register used, although there will be an insignificant loss in accuracy.

The present machine is also capable of performing problems in division by repeated subtraction of a set up divisor from a dividend previously entered until an overdraft occurs after which an addition cycle ensues with printing of the quotient digit, the divisor used and a back spacing of the divisor set-up mechanism. This cycle of operations is automatically repeated until the problem is completed after which the machine cycles to print the remainder as a total. The extend key may be used in division problems wherein more quotient digits are desired than will be computed before the normal termination of the problem. This key when depressed prevents the usual problem concluding operation until the divisor set-up mechanism has been returned to normal position by the back space mechanism alone.

The multiplier set-up slide may be used in division to predetermine the number of quotient digits to be computed before the machine shall be automatically stopped and the remainder cleared out. As shall be pointed out at a later point, the mechanism which initiates the terminating operations is ineffective unless the multiplier set-up slide is in the normal 0 position and this slide is returned one step at each additive machine cycle. Hence if a division problem would normally terminate before the multiplier set-up slide has returned to normal, such termination is delayed until the slide has reached zero, one step for each addition cycle, which cycle corresponds to one quotient digit determination.

*Basic adding machine*

(Figures 1, 2, 3, 4 and 6)

The calculating machine used for the present embodiment is basically a commercial Underwood Sundstrand portable adding machine. This machine is well known in the art and fully disclosed in U. S. patents including among others the following patents to Oscar J. Sundstrand, Patent No. 1,583,102, issued May 4, 1926; No. 1,885,489, issued November 1, 1932, and No. 1,965,611, issued July 10, 1934. The structure of this machine will be briefly set out herein but only insofar as is required for an understanding of the present invention.

Referring to Figure 3, a number of digit keys 30, see also Figures 1 and 2, generally ten, are connected to a like number of interponents 31 mounted on a swinging frame 32. A stationary group of settable pins 33 are traversed by the frame 32, one step for each operation of a digit key 30, each stop 33 in register with the swinging frame 32 being settable through interponents 31 by the associated key 30.

A plurality of bars 35 slidable on a fixed rod 36 carry type 37 on their upper ends and swingable arms 38 pivoted to their lower ends. The forward ends of arms 38 are engaged in slots in a group of feeler rods 39 movable into engagement with the set ones of the pins 33. A sliding frame 40 is connected to the rear end of swinging frame 32 to move in synchronism therewith and guide the upper ends of feeler rods 39. The type bars 35 are normally retained in their lower position as shown in Figure 3 and are tensioned upwardly to bring their feeler rods 39 into engagement with the set ones of the stops 33 by individual arms 42 pivoted on a shaft 43. Arms 42 carry a stud 44 on their forward ends, the stud 44 resting in a slot 45 in a rearward projection 46 of type bar 35, and are urged clockwise by springs 47 connected between their rear arms and a rod 48 driven downwardly during a machine cycle. A bar 49 overlies all of the arms 42 to hold the type bars 35 in the normal position and is operated during each cycle to free the arms 42 and permit rise of the type bars 35 against the set pins 33 and to thereafter restore these parts to their normal position.

A platen 52 provided with the usual paper feed rolls 53 is positioned to the rear of the type 37 to carry a strip of paper in printing position. The type 37 are impelled, when the type bars 35 are properly positioned to print upon the paper, by the usual group of type hammers 54 as more fully described in the above noted patents.

Carried by the projections 46 of type bars 35 are two groups of rack bars 55 and 56 connected to projections 46 by pins 57 on the projections engaged in slots 58 in the rack bars 55 and 56 and by springs 59[a] tensioning the racks 55 and 56 to their lower positions. The normal position of the racks 55 and 56 is determined by the engagement of an ear 59 on the bar 55 or 56 and a tens transfer lug 60. A register 61 positioned between the rack bars 55 and 56 is engageable with racks 55 for addition and positive total and sub-total taking and with the racks 56 for subtraction and negative total and sub-total taking operations. Transfer teeth 62 on the wheels of register 61 may in one direction of rotation of the wheels engage latch noses 63 to release the associated lug 60 from engagement with ears 59 and free the rack bar 55 or 56 of the next higher order for an additional downward step of movement. In the other direction of rotation, nose 63 will arrest transfer tooth 62 to prevent further movement of type bar 35 and thus enable totals and sub-totals to be taken. Such transfer noses 63 and 60 as may be released on a machine operation are restored to effective position by a pair of bails 64 on interconnected levers 66 pivoted on shafts 65 with the stop lugs 60 and operated toward each other during the first half of the next machine cycle by engagement of a power operated bail 67 with a rearward extending arm of one of the levers 66.

The register 61 is moved into and out of engagement with the racks 55 or 56 by structure fully shown in the above noted patents so only a brief description will be incorporated herein. Referring to Figure 4, a lever 71, fixed to a shaft 72 connected by a linkage (not shown) to the register 61, is operable from a central position counterclockwise to the Figure 4 position to shift register 61 into engagement with the addition racks 55 and clockwise to engage register 61 with racks 56 for substraction operations.

Lever 71 is shifted between its three positions by a shiftable power operated link 73 having two notches 74 and 75 for engagement with pins 76 and 77 on lever 71. Normally, link 73 is positioned with its lower notch 75 in engagement with lower pin 77 and in such position rearward movement of link 73 will shift register 61 into engagement with racks 55 for addition operations. Link 73 is shiftable when it is in its forward position, to engage pin 76 in notch 74 by a lever 78 pivoted at 79 on the frame and tensioned by a spring 80 between one of its arms and a slide 81 to hold a pin 82 on the arm against the rear end of a slot 83 in slide 81. Slide 81 is urged forwardly by a spring 84 connected to an ear on the slide and a part of the machine frame to hold lever 78 and link 73 in the addition position. During subtraction and negative total operations, slide 81 is moved rearwardly to tension spring 80 to move lever 78 and link 73 to the subtraction position as soon as link 73 is moved forwardly to center the register.

The forward end of link 73 is supported on a stud 86 fixed in an arm 87 pivoted to the main frame at 88. Stud 86 is extended into a cam slot 89 of a plate 90 pivoted at 91 and carrying two studs 92 and 93, see Figure 6. The cam slot 89 is so formed that in the clockwise position of plate 90, the link 73 is moved rearwardly to engage the registes 61, counterclockwise movement of plate 90 resulting in a disengagement of the register 61 from racks 55 and 56. Plate 90 is shifted for addition and subtraction operations by a swingable pawl 94 pivoted on a plate 95 fixed to the main operating shaft 96, a spring 97 between the pawl 94 and plate 95 tensioning pawl 94 to a vertical position. Plate 95 and main shaft 96 normally rest in the Figure 4 position but with pawl 94 in engagement with stud 92. Initial movement of shaft 96 will then throw plate 90 to the counterclockwise position and cause disengagement of the register 61 and racks 55 or 56.

The register is reengaged with the racks for addition or subtraction as determined by the position of slide 81 and lever 78 at the beginning of the return half of the cycle by pawl 94 engaging stud 93 (Figure 6) and rocking plate 90 clockwise. Reengagement of the register 61 with racks 55 or 56 may be prevented by operation of a Non-Add key 99, Figure 6. This key 99 carries an extension 100 overlying a stop arm 101 which in normal position retains a spring urged slide 102, Figure 4, against rearward movement. Slide 102 is cyclically released for rearward movement and restored to forward position by an arm 103 forming part of the ribbon feed mechanism (not shown), the arm 103 oscillating rearwardly and forwardly during each cycle. Slide 102 in its rearward position engages the edge of pawl 94 during the mid cycle part of its movement and retains it rocked sufficiently to prevent engagement of the pawl 94 with stud 93 on the return of plate 95. Hence the register shifting link 73 is not moved rearwardly to engage the register 61 with the rack bars.

Slide 81 is shifted rearwardly to determine subtractive engagement of the register 61 with racks 56 by a swinging frame 104, Figure 20, pivoted on studs 105 in the machine frame, frame 104 having a spring pressed nose 106 engageable with a stud 107 on slide 81, see also Figure 4. Frame 104 is oscillated upon each machine cycle to move nose 106 rearwardly and may be elevated to bring nose 106 into alignment with stud 107 by an extension (not shown) of the subtract key 108, Figure 2, or automatically as will be set out at a later point herein.

The mechanism is also capable of total and sub-total taking operations, either positive or negative, under control of the non-add total key 99 or the add sub-total key 98 but as no change has been made in the structures involved over that of the patents referred to above, no further description of this mechanism is deemed necessary at this point.

*Multiplying mechanism*

Multiplication is performed on the present machine by a process of repeated addition starting with the highest denominational order of the multiplier and reducing the multiplicand by a factor of 10 for each succeeding multiplier digit.

*Multiplicand entry*

(Figures 1, 2 and 3)

The first step in a multiplication operation is the entry of the multiplicand into the set of pins 33 by operation of the digit keys 30. The multiplicand is properly denominationally located by entering only the significant digits of the multiplicand followed by a number of zeros equal to the number of digits in the multiplier less one, i. e. if the multiplier is a five digit number, four zeros are to be entered after the significant digits of the multiplicand. Under these conditions and considering that the multiplicand is reduced by a factor of 10 at the end of the multiplication by each multiplier digit, that is, one zero is eliminated, it will be seen that during the multiplication by the last digit of the multiplier, the type bar in the units order will rise above zero. This rise of the units type bar is used to signal the end of the multiplication operation in a manner to be described hereinafter.

*Entry of the first multiplier digit*

(Figures 1, 2, 11, 12 and 27)

After the multiplicand is entered on pins 33 and the swinging frame 32 properly positioned denominationally, the first digit of the multiplier is set up on a slide 110, having a finger piece 109, Figures 1, 2, 11 and 12 by moving the slide rearwardly a number of steps equal to the value of the multiplier digit. Slide 110 is slotted at 111 and guided on a stud 112 in the frame, the stud passing through slot 111. Slide 110 is further guided by three studs 113, one of the studs being headed, which embrace a track member 114 secured to stud 112 and to the machine frame. Slide 110 normally stands in the "0" position and when moved from that position to any significant digital position, it sets the printing controls to determine that the ensuing cycles except that one when the slide returns to "0" shall be non-print cycles. The rear end of slide 110 is cut at an angle so that in the "0" position of the slide, it is free of a roll 115 mounted on a lever 116 pivoted on a fixed stud 117. When the slide 110 is moved one or more steps rearwardly to a digital position, the angular face cams roll 115 upwardly to rock lever 116 counterclockwise and lower the rear end from the path of a sliding bar 118, see also Figure 27. Bar 118 is fixed to a slide 119, movable to the left on two screws 120 fixed in the machine frame. In the normal position of bar 118 a slot 121 therein is in alignment with a spring urged paper feeding slide 122. Slide 122 is held in the Figure 12 position and is freed to move rearwardly during each machine cycle by a roller 123 on a plate 124 connected by a link 125 to a plate 126 on the main shaft 96 and when freed will move into the slot 120 of bar 118 and on its return movement rotate the platen 52 through the arm 127, pawl 128 and platen ratchet 129.

Bar 118 also controls the printing hammers 54 to determine a non-print operation. In printing operations, the type hammers 54 are retained and released at the proper time by a bail 133 overlying noses 134 of the hammers 54. This bail 133 is urged into engagement with the hammers 54 and is moved to released position by a lever 135 carrying a by-pass pawl 136. At the start of the return stroke of main shaft 96, a stud 137 forming the connection between plate 126 and link 125, engages a nose 138 on pawl 136 to rock pawl 136 and lever 135 clockwise and disengage bail 133 from the noses 134 causing printing of the amount set up on the type bars 35. A lever 139 normally retained in a clockwise position by a stud 140 on plate 124 engaging beneath the rear end of the lever is urged by a spring 141 into engagement with a pin 142 on by-pass pawl 136. Counterclockwise rotation of lever 139 will result in lifting by-pass pawl 136 to a position clear of stud 137 of plate 126 so that bail 133 will not be then actuated to release the type hammers 54 for printing. Bar 118 has a solid portion 143, Figure 27, normally under an ear 144 of lever 139 thereby preventing movement of lever 139 to disable the printing mechanism.

When bar 118 moves to the left as it does during multiplication or division cycles in a manner to be later described, it will move to a position wherein the paper feed slide 122 will be blocked by a solid part 145 of the bar 118 and ear 144 of lever 139 will pass through slot 121, thus disabling both the platen feeding mechanism and printing hammers. When slide 118 is blocked by lever 116 during the operation in which multiplier slide 110 is in "0" position, it is midway between the two extreme positions and in such position the solid portion 143 still arrests lever 139 to permit release of the printing hammers and slide 122 is aligned with a second slot 146 in bar 118 to enable platen feed by slide 122. Thus in this position of bar 118 printing and platen feed will occur.

Movement of multiplier slide 110 to the rear from the "0" position also moves a stud 147, Figures 11 and 12, on the slide 110 from engagement with an arm of a lever 148 pivoted on a stud 149. Lever 148 is connected by a spring 150 to a lever 151 and carries a stud 152 engageable with an upper arm of lever 151 to determine the limit of relative movement of the two levers. A spring 153 connected to lever 151 biases levers 148 and 151 to a counterclockwise position to which they move when stud 147 is moved from lever 148. In such counterclockwise position a stud 154 on the upper arm of lever 151 moves to the rear of a shoulder 155 of an arm 156 and the lower arm carries forward a link 157 connected thereto for a purpose to be later set out.

*Operation of the multiplication key*

(Figures 8–12, 14, 16–19, 23–25 and 28)

Following the entering of the two multiplcation factors as above described, the machine is set into operation to compute the product of these factors by operation of the multiplication key 160, Figures 1, 2, 4 and 11. Depression of this key 160 serves to position pivoted multiplication cradle 161, Figure 11, through the engagement of a stud 162 on key 160 with an arm of a lever 163 connected by a link 164 with a stud 165 on cradle 161. Cradle 161 is held in its actuated position against the tension of its restoring spring 161ª by a toothed latch lever 166 engaging stud 165 on the cradle 161.

The multiplication cradle 161, when set to active position conditions the control elements of the machine for performing multiplication. One phase of this conditioning is the disabling of the mechanism for restoring the swinging gate 32 to the initial position and thus restoring the set pins 33 to unset position. Gate 32, see Figure 8, has secured thereto an arm 190 carrying a pin 191 in a slot 192 of a slide 193. Slide 193 is moved rearwardly as gate 32 escapes during the setting up of an item in pins 33 and is moved forwardly to restore gate 32 and pins 33 to the initial position. Normally, slide 193 is moved forwardly near the end of a machine cycle by a notched arm 194 engaging an ear 195, see Figure 9, of slide 193. Arm 194 is pivoted on a bell crank 196 and biased upwardly into engagement with ear 195 by a spring 197. In the normal position of the mechanism, bell crank 196 is in its clockwise position with its rear arm resting against a roller 198 on plate 126 fixed to the main shaft 96, arm 194 resting in its forward position and held out of engagement with ear 195 of slide 193 by an arm 199 on bell crank 196. Initial rotation of shaft 96 clockwise rocks bell crank 196 counterclockwise to move arm 199 from above arm 194 and so permit arm 194 to move upwardly to a position limited by engagement of the upper edge of arm 194 wtih the conventional repeat key 201, Figure 1. Further movement of bell crank 196 draws arm 194 rearwardly to a point beyond movement of ear 195 of slide 193. On the return stroke of bell crank 196 under the influence of spring 197 and another spring 200, arm 194 engages the ear 195 and returns slide 193 and gate 32 to normal position. Near the end of this stroke, arm 199 of bell crank 196 engages and lowers arm 194 to free slide 193 for subsequent movement under control of keys 30.

This restoring mechanism is disabled by cradle 161 when set by the multiplication key 160. A lever 202, Figure 9, has one end in front of cradle 161 to be moved thereby when the cradle is set and has its other end in a slot in the end of a bell crank 203 pivoted to the left side of the machine frame. This bell crank 203 carries a roller 204 overlying arm 194 of the set-up restoring mechanism and when rocked by cradle 161, roller 204 is lowered to hold arm 194 in the ineffective position with respect to slide 193, thus disabling the set-up restoring mechanism.

The multiplication cradle when set also enables a mechanism to return the swinging gate 32 one step toward the restored position. As shown in Figures 9 and 10, slide 193 is formed on its top edge with a series of ratchet teeth 208. A back space key 209 carries a pawl 210 normally free of teeth 208 but depressible into engagement therewith by key 209. Further depression of key 209 forces slide 193 forward to return gate 32 one step toward normal and in effect reduces the set up amount by a factor of 10. At the bottom of the stroke of key 209 a second tooth on pawl 210 engages in a second series of teeth 211 on slide 193 to prevent overthrow of the slide. The key 209 is automatically operated to back space the set-up mechanism under control of the multiplier slide 110 and the multiplication cradle 161.

Referring to Figures 14, 23 and 24, the cradle 161 at its top right hand end is formed with a hook 212 overlying a pin 213 on an arm 214. Arm 214 is fixed to a shaft 215 extending to the left side of the machine and biased clockwise in Figures 23 and 24 by a spring 216 connected to an arm 217 on the left end of shaft 215. A link 218 connected to the end of arm 217 is connected by a pin and slot connection to a bell crank 219 pivoted on a stationary stud 220. The other end of spring 216 is connected to bell crank 219 to hold the parts in the position shown. A stud 221 on slide 110, when slide 110 is moved forwardly from the zero position, Figure 25, engages the upright arm of bell crank 219 to rock it clockwise and through spring 216 urge shaft 215 clockwise. If the multiplication cradle 161 is in its actuated position, the hooked upper end of cradle 161 is free of stud 213 and when shaft 215 is tensioned as above described, stud 213 will be elevated. Stud 213 is free in a slot 222 of a slide 223 and when elevated will lift the rear end of the slide 223 to the position shown in Figure 24. The forward end of slide 223 is connected to an arm 224 of a shaft 225 running across to the left side of the machine. The left end of shaft 225 carries another arm 226 which has a depending link 227 provided with a slot 228 embracing a stud 229 on the back space key 209.

Slide 223 is moved rearwardly to depress back space key 209 through parts 224, 225, 226 and 227, by a power operated stud 230. Stud 230 is mounted on a pivoted plate 231 urged by a spring 232 into the Figure 23 position and is rocked clockwise near the end of each machine cycle by a stud 233 on plate 234 fixed to the main shaft 96. When the rear end of slide 223 is elevated by movement of slide 110 forwardly of the "0" position, the end of slide 223 is brought into alignment with stud 230 so that slide 223, and through it the back space key 209, is operated near the end of the machine cycle.

Multiplication cradle 161 when set also conditions the non-print mechanism to disable printing. As shown in Figures 14 and 19, a link 233 is connected to a stud on the right side of cradle 161 and is pulled forwardly when the cradle is set. This link is connected to a latch 234 which has a hooked end engaging an arm of a bell crank 235 connected to the non-print slide 119. Latch 234 retains bar 119 in the Figure 19 position during addition and subtraction cycles. When latch 234 is released by cradle 161, slide 119 is free to move to the non-print controlling position but is retained in normal position by a spring 236 connected to the bell crank 235. During cycles with the latch 234 released, slide 119 is moved to the left to the full non-print position or to the partial position against lever 116, Figure 12, for printing by a spring driven lever 237 urged upwardly by a spring 238 capable of overcoming spring 236, the lever 237 resting against the bottom edge of a link 239 depending from bell crank 235. Lever 237 is retained in its ineffective position by engagement of a roll 240 with a lower arm of the lever 237. Roll 240 is fixed in a power operated plate 241 and is operated generally forwardly and then rearwardly to shift slide 119 to the left and to return it to the right during each machine cycle in which the multiplication cradle is set.

Setting of cradle 161 will also condition a mechanism to retain a detent for the cycle counter bar in detenting position. This cycle counting bar 242, Figures 16, 17, 18 and 19, is generally similar to the type bars 35 and is provided at its upper end with type running from a decimal type normally at the printing point to "0" to "9" type and an ER type. This bar 242 is raised one step per cycle by a mechanism to be later described and is during multiplication cycles retained in the advanced positions by a detent 243 engaging in a series of notches 244 in the front edge of bar 242. Detent 243 is pivoted on a shaft 246 and is urged by a spring 247 toward the notches 244 but normally is retained away from the notches 244 by a pin 248 fixed in an arm 249 on shaft 246. Shaft 246 is rocked clockwise in Figure 19 by a lever 250 which has a slot 251 embracing a stud 252 on another arm 253 fixed to shaft 246.

Fixed to the upper end of lever 250 is a hooked link 254 having a stud 255 and normally positioned with its hooked end to the rear of a stud 256 on cyclically moved plate 241 as shown in Figure 14. In this position of link 254, plate 241 at the end of each cycle will positively restore lever 250 to the Figure 19 position to disengage detent 243 from bar 242. When the multiplication cradle 161 is set, it rocks latch lever 234 as above described to raise link 254 through a link 257 connected to stud 255 and latch lever 234. In this position the link 254 is free of stud 256 and will not be restored to free counter bar 242.

Key 160 when depressed also depresses the non-add key 99, Figure 11, so that the first machine cycle shall be non-addition. An arm 167 pivoted to key 160 has a shoulder 168 normally positioned above a stud 169 secured to key 99 to form a one-way connection between these two keys. Non-add key 99 is latched down by the usual cyclically released latch slide 170, Figure 15, but no latch is provided for key 160 so it returns to normal position upon removal of the finger therefrom. A link 159, connected between arm 167 and non-add slide 102 is provided to withdraw arm 167 from stud 169 during the non-add cycle to permit restoration of key 99 even though key 160 is held depressed.

Key 160 when depressed also conditions a mechanism to restore multiplier slide 110 from the advanced position back to normal position. Referring to Figure 11, a second arm 171 similar to arm 167 is fixed to arm 167 and overlies an arm 172 of a yoke 173 so that depression of key 160 rocks yoke 173 counterclockwise. The left arm 174 of yoke 173 is formed with a shoulder 175 normally resting in front of a stud 176 on an arm 177 of the multiplier slide feed mechanism, the arm 174 being rocked by key 160 to move out of the path of stud 176 to permit feed of slide 110. Yoke 173 is retained in its operated position by a latch lever 178 which hooks over a square stud 179 on arm 174 in the operated position of yoke 173.

Operation of yoke 173 also enables a mechanism to retain the main cycling clutch (not shown) released until the multiplying operation is completed. The clutch is released as in the conventional Sundstrand machines by forward movement of a link 180, Figures 10 and 11, by any of the motorized control keys through a pivoted wire 181 rockable by these keys. As key 99, operated by multiplication key 160, is such a motorized key, operation of key 160 rocks wire 181 and wire 181 is held in such rocked position, to keep the machine cycling by a shoulder 182 on the latch lever 178, the shoulder moving behind wire 181 when the lever 178 moves to latch yoke arm 174.

Depression of multiplication key 160 also serves to condition a mechanism to permit release of the multiplication cradle 161 at the proper time, that is, after all multiplier digits have been entered. As shown in Figures 11 and 12, and as pointed out above, setting of slide 110 to a significant digit, permits spring 153 to rock lever 151 counterclockwise, positioning stud 154 to the rear of shoulder 155 on arm 156. Arm 156 is urged counterclockwise by a spring 183 and is normally retained in its upper position by a latch 184 which engages under an ear on the upper part of arm 156. Latch 184 has an end 185, see also Figure 5, angularly turned down adjacent a stud 186 on key 160 so that depression of key 160 will rock latch 184 to release arm 156. Arm 156 when released retains arm 151 in the set position until arm 156 is raised by the engagement of a stud 187 on slide 110 with the angular rear end of arm 156 during the movement of slide from the "0" position to a more forward sub-units position. As this mechanism is effective to release multiplication cradle 161 only after multiplication is completed, further disclosure of the functions of these parts will be delayed until the proper time in this specification.

*First multiplication cycle*

Depression of multiplication key 160 in operating non-add key 99 has through wire 181 and link 180 initiated a machine cycle. During this cycle, shaft 96 rotates counterclockwise, Figure 6, rocking plate 241 clockwise and, Figure 12, rocking plate 124 counterclockwise and plate 126 clockwise. At the start of the cycle, register 61 is thrown out of mesh with the racks 55 or 56 by pawl 94, Figure 4, acting upon stud 92.

The platen feed and the printing hammer release mechanisms are disabled at the start of the cycle by bar 118 and slide 119, Figure 19, moving to the left. Roller 240 of plate 241 frees lever 237 as plate 241 moves and thereupon spring 238 acts to rotate lever 237 clockwise to rock lever 235 through link 239 and move slide 119 leftward. Lever 235 has been unlatched at this time by rotation of latch lever 234 from multiplication cradle 162 through link 233 as above described. As lever 116, Figure 12, has been rocked clear of bar 118 by movement of multiplier slide 110, bar 118 is free to move to its full left hand position and prevent paper feeding and printing hammer release.

Multiplier slide 110 is at this time moved one step toward its home position. Referring to Figures 11, 12, 23, 24 and 28, plate 126 on main shaft 96 carries a roller 260 initially slightly spaced from an angularly shaped end of an arm 261. Arm 261 is pivoted on a stud 262 and tensioned by a spring 263 into engagement with a fixed stud 264. Also pivoted on stud 262 is arm 177 tensioned by a spring 266 to engage its front edge with a pin 267 of arm 261. Stud 176 previously referred to is secured in arm 177 and carries pivotally mounted thereon, a ratchet pawl 268. Pawl 268 is urged counterclockwise by a spring 269 into engagement with a fixed stud 270, the forward end 271 of pawl 268 being, in this position, free of a series of teeth 272 on the lower edge of multiplier slide 110. As latch arm 174 is moved to ineffective position with respect to stud 176 upon depression of multiplication key 160 and latched there by latch lever 178, as plate 126 rocks during the cycle, roller 260 rocks arms 261 and 177 clockwise to move pawl 268 forward. Due to the shape of the upper edge of pawl 268, as it moves forward, it is freed from stud 270 and rocks upwardly to engage the end 271 with an adjacent tooth 272 of slide 110. Further movement of plate 126 and rocking of arms 261 and 177 moves slide 110 one step forward. Spring 266 between arms 261 and 177 forms a flexible connection between these arms to prevent damage if slide 110 is prevented from moving or if stud 176 is latched by arm 174.

During the first half cycle, the counter type bar 242, Figures 16, 17 and 19, is raised to the "0" printing position and detent 243 for the bar 242 is placed in restraining position. Rocking of latch lever 234 by setting of multiplication cradle 161 has raised hooked arm 254 free of pin 256 on plate 241 so that lever 250 is free to remain in any set position, a notched detent arm 273 tensioned by a spring 274 into engagement with a pin 275 on the upper end of lever 250, yieldably retaining lever 250 in any set position. A slide 276 is urged by a spring 277 to the left in Figure 19 and is carried by two studs, one stud 278 being in lever 250 and the other 279 being in plate 241. Slide 276 is formed with a slot 280 embracing stud 278, the length of the slot being such that lever 250 is free to oscillate between the normal position and an intermediate position. Slide 276 is also formed with a curved slot 281 embracing stud 279 of plate 241. This slot is of an extent sufficient to permit plate 241 to rock its full extent of movement without any driving effect on slide 276, the stud 279 serving to engage the rear end of slot 281 to restore slide 276 from any advanced position. The rear end of slide 276 is bent off into an ear 282 normally resting behind a lower arm of lever 235. When lever 235 is rocked at the beginning of a cycle as above set out, slide 276 is free to follow stud 279 under the urging of its spring 277. In such movement, the engagement of the rear end of slot 280 with stud 278 will rock lever 250 from its rearward position through the intermediate position to a full forward position as shown in Figure 16. This movement of lever 250 rotates shaft 246 to move pin 248 of arm 249 and thus permit engagement of detent 243 with bar 242 to hold the bar in any set position.

Movement of lever 250 to its full forward position, also advances bar 242 to bring the "0" type into printing position. Arm 249 of shaft 246 carries a feed pawl 283 pivoted thereon. Pawl 283 is, in the normal position of shaft 246 and lever 250, tensioned by a spring 284 into engagement with the upper end of arm 249 and is brought into engagement with the teeth 244 of bar 242 when shaft 246 is rocked to an intermediate position. Continued movement of lever 250 to the full forward position further rocks shaft 246 and raises pawl 283 to lift type bar 242 one step to bring the "0" type 37 to the printing point. Detent 243, also free at this time, holds the bar at this point. Return of plate 241 to its home position at the end of the cycle restores slide 276 to its original position but this does not fully restore lever 250. The lost motion between stud 278 and slot 280 is such that lever 250 returns only to the intermediate position, thus leaving detent 243 in retaining position. Lever 250 can be restored to the normal position only by engagement of stud 256 and hooked arm 254 but arm 254 is raised at this time by latch lever 234 and lever 250 is thus only partially returned.

During this first cycle, non-add key 99 has remained depressed since it was depressed by multiplication key 160 and latched in this position. With the non-add key depressed, slide 102, Figure 4, is in its rearward position and in such position, pawl 94 is prevented, during the second half of the cycle, from engaging stud 93 to throw the register 61 into engagement with add racks 55. Consequently this first cycle is a non-add cycle even though type bars 35 are advanced to the positions determined by the set pins 33. The register 61 is returned to mesh with racks 55 at the end of the cycle by the usual mechanism consisting of an arm 285, Figure 6, having a bent off ear 286 engageable by the lower edge of plate 95 at the end of the cycle and connected by a link 287 to plate 90. The non-add key 99 is released for return to normal position at the end of the cycle.

*Succeeding multiplication cycles*

Upon the conclusion of the first multiplication cycle as described above, a second cycle ensues automatically. It will be recalled that upon rocking of latch pawl 178, Figure 11, the cycle instituting wire 181 and link 180 are latched in their actuated positions. As latch 178 is not released at this time, the second cycle follows automatically. This second cycle and all succeeding cycles except the last cycle of the multiplier digit entry are all duplicates of the above described first cycle with the single exception that non-add key 99 is not depressed for these cycles. The succeeding cycles will then be addition cycles, the set up multiplicand being entered additively into register 61 on each cycle.

Also during each cycle, as above explained, the printing mechanism will be disabled, the multiplier set-up slide 110 will be restored one step toward the home position and the counter type bar 242 will be elevated one step to successively bring type 37 to the printing point.

*Last multiplier cycle*

(Figures 12, 14, 19, 23, 26 and 27)

The last cycle in the multiplication by the first multiplier digit starts with the multiplier set-up slide 110 in the normal or "0" position. At this time the machine has cycled a number of times equal to the digit set up but as the first cycle was a non-add one, an extra cycle is required to enter the multiplicand the proper number of times. Also, the counter bar 242 is positioned to print a digit one less than the number of cycles which have ensued and must be elevated to the proper digit.

During this last cycle, the printing mechanism is enabled to cause printing of the multiplicand and the multiplier. Since multiplier set-up slide in "0" position at the start of the cycle, its rear end is not holding lever 116, Figures 12 and 27, in the rocked position so the rear end of lever 116 is in obstructing position with bar 118 to arrest the bar in its intermediate position. In this intermediate position, both the platen feed mechanism and the type hammer release mechanism are operable so the multiplicand will be printed just after mid cycle. The movement of lever 235 is sufficient to release slide 276 and the counter bar 242 will then be elevated one additional space to bring the proper type to the printing line. Upon release of hammers 54, the multiplicand and the proper multiplier digit will be printed on the paper about platen 52.

When multiplier set-up slide 110 is returned during this last cycle, it moves from the "0" position to a sub-normal position. Slide 110 is retained in this sub-normal position until near the end of the cycle by a latch 290, Figures 23 and 26, tensioned counterclockwise by a spring 291 into engagement by its bent over front end 292 with the notched rear bottom edge of slide 110, the latch being normally retained disengaged by the abutment of roll 260 on plate 126 with its rear end. At the beginning of the cycle, roll 260 frees latch 290 for movement into engagement with slide 110, see Figure 26, and when slide 110 moves into the sub-normal position, it is latched there by ear 292 dropping into engagement with one of the notches in the end of slide 110. Slide 110 is urged back to the normal "0" position by a roll 293, see also Figure 12, on an arm 294. Arm 294 is urged upwardly by a spring 295 and the roll 293 normally acts with the teeth 272 of slide 110 to detent the slide 110 in its set position. When slide 110 moves to the sub-normal position, an inclined edge 296 on the bottom edge forces roll 293 downwardly. Then, when latch 290 is released at the end of the cycle, spring arm 294 and roll 293 act to restore slide 110 to the "0" position.

In its movement to the sub-normal position slide 110 releases the latch 178 by the engagement of a stud 265, see Figure 11, on slide 110 with an arm 297 forming a part of latch 178. Latch 178 when released frees arm 174 of yoke 173 to move upwardly in front of stud 176 and block any further movement of the feed pawl 268 for slide 110. The forward end of latch 178 moves away from wire 181 to free the wire 181 and link 180 to permit the cycle stopping mechanism to operate and stop the multiplication at the end of the current cycle.

Slide 110 in its sub-normal position also releases latch arm 156 from pin 154 on arm 151 but as this mechanism operates only when multiplication has been completed, a further description of this function will be delayed.

The slide 110 in its sub-normal position further conditions the back space mechanism for swinging gate 32. Referring to Figures 23 and 25, stud 221 on slide 110 engages and rocks arm 219 as slide 110 is moved to the sub-normal position. This arm, through spring 216, arm 217, shaft 215 and arm 214, raises slide 223. It is to be noted that arm 214 was released by movement of multiplication cradle 161 to its set position and as the cradle is set at this time, the arm is still released. Arm 223 is raised to bring its rear end behind stud 230 of plate 231 and as this plate 231 is rocked at the end of a cycle, as previously described, slide 223 is actuated to operate key 209 and return the swinging gate 32 one step toward its normal position.

Slide 223 when thus actuated to back space gate 32, also releases the detent 243, see Figures 14 and 19. Slide 223 when raised has a projection 298 thereon aligned with a stud 299 on lever 250. During the rearward actuation of slide 223 by stud 230 at the end of the cycle, projection 298 strikes stud 299 and returns lever 250 to the normal position, releasing detent 243 and feed pawl 283. This release of detent 243 and pawl 283 frees counter bar 242 for return to the normal position by its spring and since this occurs after the printing hammers are released, the printing of the correct digit is not interfered with.

At the end of this cycle, the clutch is arrested and the machine stops cycling. Slide 110 is freed from latch 290 and returns to "0" position, back space slide 223 drops to its normal position, and the machine is prepared for the entry of the second multiplier digit, multiplication cradle 161 remaining set.

*Second multiplier digit*

The operation of the machine for the second multiplier digit is a duplication of that for the first digit except for two variations. In initiating operations for this multiplier digit, multiplier cradle 161 is already set in active position and will not then be set when multiplication key 160 is operated for the second time. Also the multiplicand set up is not the same since due to the operation of the back space mechanism, the set up has been reduced by a factor of 10. The remaining operations are identical to those for the first multiplier digit.

*Last multiplier digit*

The cycle of operations for the last multiplier digit is a duplication of the operations for the other digits with the exception that during the last cycle the swinging gate 32 is fully restored to its home position, wiping out the multiplicand set up, and the cradle 161 is restored to normal position.

It will be recalled that the multiplicand figure was set up with a number of zeros following it. These zeros, one less than the number of multiplier digits, were eliminated during the prior multiplying cycles so that when the last multiplier digit is being entered, the units multiplicand digit is in the lowest denominational place and for the first time the units order type bar 35 is permitted to rise above the "0" position. This movement is utilized to control restoration of multiplication cradle 161.

Referring to Figure 11, it will be recalled that on movement of multiplier slide 110 from "0" position, levers 148 and 151 are freed to move counterclockwise about their pivot 149 moving slide 157 to the front of the machine. This slide 157 is slidably carried at its rear end by a slot in the slide surrounding shaft 246. In its forward position, a nose 300 pivoted on the slide 157 overlies an ear 301 on an arm 302 of shaft 303. Shaft 303 is tensioned counterclockwise by a spring 304, see also Figure 12, and is retained in its normal Figure 11 position by the engagement of an arm 305 on the shaft with a pin 306 on the lowest order type bar 35. Arm 305 is a part of a bail 307 free on shaft 303 and is connected by a spring 308 to a post 309 on shaft 303, spring 308 being stronger than spring 304 and so tending to retain shaft 303 in the clockwise position. Fixed to the right end of shaft 303 is an arm 310 connected by a link 311 to an arm 312. Arm 312 is pivoted at its forward end to the latch 166 for the multiplier cradle 161 and when moved rearwardly will release the cradle 161 for restoration to normal position.

The rear end of arm 312 is formed with a projection 313 normally free of a square stud 314 on an arm 315 but movable into the path of such stud. When the multiplier slide 110 is in any digital position, spring 153 rotates lever 151 to move slide 157 forwardly to place nose 300 above ear 301 of arm 302. Thereafter, when during the entry of the last multiplier digit units type bar 35 moves above the zero position, arm 302 is arrested at an intermediate position by nose 300. When the slide 110 is restored to the "0" position, stud 147 on the slide 110 engages lever 148 to rock it clockwise but lever 151 cannot follow in this movement for at this time shoulder 155 of arm 156 is in engagement with pin 154 of lever 151. When slide 110 moves from "0" into the sub-normal position during the early part of the last cycle, it raises arm 156 to free lever 151 which then moves to its clockwise position moving slide 157 to the rear and nose 300 from above ear 301. Now as the units order type bar 35 moves above "0," arm 302 is free to move through its intermediate position and in so doing it lowers arm 312 into the path of movement of square stud 314 to release cradle 161.

Arm 315 is rocked forwardly at the end of the first half cycle and rearwardly at the beginning of the return cycle by bar 48 engaging the cam shaped upper end of arm 315. This bar 48, see Figure 14, is connected to plates 241 and 124 by slides 316 connected at their upper ends to plates 241 and 124 and slidable on fixed studs 317. As plates 241 and 124 rock during the cycle, bar 48 is lowered and cams arm 315 forwardly against the tension of the spring 318 which acts upon arm 315 through link 319 connected to arm 315 at one end and slidable on a fixed stud 320 at the other end. When arm 312 is lowered as above described, the return movement of arm 315 moves arm 312 rearwardly to free cradle 161 from its latch 166 at shortly after the middle of the cycle.

When cradle 161 is freed and moved to normal position by its spring 161ᵃ, it reenables the restoring mechanism for swinging gate 32 by releasing the arm 202, Figure 9. This permits the spring 221 for arm 202 to lift roller 204 from the restoring arm 194 and this arm 194 will at the usual time engage ear 195 of slide 193 and return the swinging gate 32 to normal position. The back space mechanism which has up to now been effective to restore gate 32 one step is again disabled by the movement of the upper hooked end 212 of cradle 161, Figure 11, over stud 213 to prevent raising of arm 223 into operable position with respect to its stud 230.

The parts have now all been restored to their normal positions and the complete product of the multiplier and multiplicand is stored in register 61. This product may now be printed by a total-taking operation or may be retained for use in other calculations.

*Division operations*

The present machine is capable of fully automatic division by the process of repeated subtraction. In this process, the divisor is repeatedly subtracted from the dividend until an overdraft occurs and then the divisor is added back once and reduced by a factor of 10. This operation is repeated until control mechanisms are effective to halt the process.

*Entry of the dividend*

(Figures 1, 2, 3 and 9)

The dividend value is entered on pins 33, Figure 3, by operation of keys 30 in the usual manner. Generally, it is desirable to enter the dividend in the highest denominational orders by entering a number of zeros after the last digit to shift the dividend value into the highest orders. The add motor bar 98, Figure 1, is then operated to enter the set up dividend into the register 61 in the usual manner. In this entry cycle, the restoring arm 194, Figure 9, is effective to restore the gate 32 and destroy the set up value after it has been entered so the parts are all in normal condition again.

*Entry of the divisor*

The divisor value is next set into pins 33 by operation of keys 30 and is spaced as above to the highest denominational orders.

*Operation of division key*

(Figures 4, 14, 20–24, 27 and 28)

Following the entering of the dividend into the register 61 and the setting up of the divisor, the division key 325 is depressed to initiate the division cycle. Referring to Figures 14 and 28, it will be noted that key 325 is connected by a bell crank 326 and a link 327 to a division cradle 328 which is outside of multiplication cradle 161. Stud 165 of multiplication cradle 161 is, in normal position, engaged with the front edge of division cradle 328, consequently when division cradle 328 is moved to a forward set position it carries the multiplication cradle 161 forwardly to a set position. Latch 166 previously described, will retain the division cradle 328 in the set position by engagement of the latch 166 with a stud 329 on the cradle 328.

Setting of the multiplication cradle 161 by the division key 325 conditions the same mechanisms which are conditioned when the cradle 161 is set by the multiplication key 160, that is, the restoring mechanism for swinging gate 32 is disabled through lever 202, pin 213, Figure 14, is freed to enable automatic operation of the back space key 209, and link 233 is moved forwardly to release latch 234 from the printing controlling lever 235 and to move counter bar releasing arm 254 from the path of stud 256 on plate 241.

Setting of division cradle 328 conditions further machine controls which act in conjunction with those set by the multiplication cradle. Division cradle 328 is connected to a link 330 which, when set, abuts a stud 331, see also Figure 28, on an arm 332 fixed to a shaft 333 to hold arm 332 in a lower position for a purpose to be later described with respect to the operation of the back space mechanism. The rear end of link 330 is connected to an arm of a bell crank yoke 334 forming part of a shifting mechanism best shown in Figures 21 and 22. Bell crank yoke 334 is pivotally mounted on fixed post 335 and is connected at its lower rear arm to a slide member 336 freely movable on studs 337 fixed in the machine frame. This slide 336 carries pivotally mounted thereon a lever 338 having two angular upturned ends 339 and 341. Lever 338 is slotted at 342 to engage a stud 343 on a slide 344. Slide 344 is carried on the framework for register 61 and has two projections 345 bent off from the slide to underlie the racks 55 and 56 of the lowest denominational order. A detent arm 346 pivoted on the register frame is urged by a spring 349 to press its stud 352 against the upper edge of slide 344 and in cooperation with projection 353 on slide 344, to retain the slide 344 in any set position. Normally slide 336 is in the position shown in Figure 21 and in this position the end 339 will be engaged upon each machine cycle by the cyclically operated rod 48 to shift end 339 and slide 344 rearwardly to move projections 345 away from racks 55 and 56.

The upper rear arm of bell crank yoke 334 is connected by a wire 347 to an arm of a yoke 348 pivotally mounted on the machine frame. The other arm of yoke 348 lies over the rear end of lever 116 previously described and when bell crank yoke 334 is rocked by the setting of division cradle 328, yoke 348 will be operated to depress the rear end of lever 116. This it will be remembered will permit the printing control bar 118 to move to its full leftward position and disable the platen feed and printing mechanisms.

The upper forward arm of yoke 334 is notched to embrace the edge of a lever 350, slidable and pivoted on stud 317. Lever 350 is made with a lower ear, see also Figure 27, bent off into proximity with a lower rear arm of spring driven lever 237 previously described. When lever 350 is shifted to the left by operation of bell crank yoke 334 from division key 325, the ear of lever 350 is moved in front of the lower rear arm of lever 237 so that lever 350 will be actuatable from lever 237 on each machine cycle. The forward end of lever 350, see Figure 20, lies under a post 351 on subtraction frame 104 and will when lever 350 is actuated from lever 237, raise frame 104. It will be remembered that raising of frame 104 will cause the next machine cycle to be a subtractive one and it will therefore be evident that operation of lever 350 will result in a subtractive engagement of register 61 with racks 56.

Setting of division cradle 328 and link 330 also moves pivoted arm 355, see Figures 14, 23 and 24, from the Figure 23 position where it underlies a stud 356 on a lever 357 to the Figure 24 position wherein the stud 356 is free of arm 355. A spring 358 connected to lever 357 tensions lever 357 counterclockwise in Figures 23 and 24 but it is normally held in its Figure 23 position even when freed by arm 355, by a latch lever 359 engaging an ear 366 on the forward end of lever 357. A stud 367 in the forward end of lever 357 lies under the lower edge of back space slide 223 and will when lever 357 is free to move to its Figure 24 position raise the rear end of slide 223 into position to be engaged by stud 230 of plate 231 and thus operate back space key 209.

The lower end of division key 325, see Figures 4 and 28, is positioned above an offset portion of cycle controlling wire 181 and upon depression of key 325 will rotate the wire to initiate a machine cycle. Key 325 is retained in a depressed position by the latch 166 since there is no free movement in the linkage from key 325 to cradle 328 and hence wire 181 will be retained in operated position and the machine will cycle continuously until the key 325 is released.

*First division cycle*

(Figures 14, 21, 23 and 24)

After the parts have been set by the operation of the division key 325 as above set out, the main shaft starts to cycle. As plate 241, Figures 23 and 24, rotates counterclockwise, roll 240 on the plate 241 releases lever 237 and spring 238 rotates the lever counterclockwise. Lever 350, now shifted to place its lower ear in front of the lower rear arm of lever 237, is likewise rocked to raise with its forward end, the subtraction frame 104, Figure 20, and determine that the cycle shall effect subtraction of the set up divisor from the dividend in the register.

At the same time, rotation of lever 237 operates bell crank 235, Figure 19, which has been released by latch 234 by setting of multiplication cradle 161, to shift bar 118 to its leftmost position. Lever 116 has been depressed out of the path of bar 118 through wire 347 by operation of division cradle 328 and bar 118 then disables the platen feed and print mechanisms as has been described.

Counter bar 242 is moved upwardly one step to its "0" position by the operation of lever 250 by slide 276 which is released by movement of bell crank lever 235 and at the end of the cycle, arm 254 being raised by the multiplier cradle 161, lever 250 is returned to the central intermediate position to retain detent 243 effective and counter bar 242 in elevated position as more fully described under the multiplication operation.

Just before mid cycle position, rod 48 engages with the end 341, now shifted into the dotted line position of Figure 21 by bell crank yoke 334, of lever 336 and rocks this end rearwardly shifting slide 344 forwardly. Slide 344 in its forward position has its ears 345 under racks 55 and 56 of the lowest denominational order and so positioned as to prevent transfer movement of these racks below their "0" position and thus effectively prevents entry of a "fugitive one" into the register 61. Such prevention of "fugitive one" entry in division operations is required to prevent the error inherent in an algebraic totalizer having both a positive and a negative total position when used for division operations.

Lever 338 is retained in this "fugitive one" blocking position by detent 352 acting on slide 344, for so long as the division key 325 is depressed. When key 325 is released at the end of a division operation, lever 338 and slide 336 are moved leftward to their normal position and on the next succeeding cycle, rod 48 engages ear 339 to shift lever 338 and slide 344 back into the ineffective position thus releasing the fugitive one mechanism for normal operation.

Plate 241, see Figures 23 and 24, during the cycle oscillates the ribbon feed arm 103 by means of a link 360. Just before mid cycle the stud 361 connecting link 360 and arm 103 engages an ear 362 of latch arm 359 to rock the latch 359 clockwise against the tension of spring 363 on the latch 359 to free lever 357 from its latched position. Such unlatching of lever 357 is, however, ineffective at this time to permit lever 357 to move for prior to this time an end 364 of lever 350 has moved into engagement with a stud 365 in the rear end of lever 357. Slide 223 is not then elevated into effective position with respect to roller 230. Latch 359 is released by arm 103 to move back into latching position with respect to arm 357 during the second half cycle.

*Subsequent division cycles*

A succeeding division cycle is a duplicate of that above described except that lever 338 having been operated during the preceding cycle is not further operated during the remainder of the division and the fact that counter bar 242 is advanced step by step, lever 250 restoring only to its intermediate detenting position. These succeeding division cycles will continue until during one of the cycles, the divisor is greater than the number remaining in the register and the remainder in the register will at the end of this cycle be a negative quantity.

*The overdraft cycle*

(Figures 20, 23 and 24)

This cycle is a duplicate of the first and subsequent cycles but since register 61 overdrafts or goes negative in such cycle, a control is shifted to change the next cycle to an additive one. In Figure 20, the transfer mechanism for the highest denomination of the register 61 and racks 55 and 56 determines shifting of an overdraft slide 368 to one or another position. When latch 63 for rack 55 is disengaged, the upper end of its arm 369 is shifted rearwardly and moves slide 368 to the rear. When latch 63 for the rear rack is released, the arm 369 for that latch will move the slide 368 forwardly. A pivoted bent plate 371, see also Figure 3, is engaged by the notched rear end of slide 368 to be moved thereby. This mechanism is a part of the conventional negative total control mechanism of the conventional machine and indicates when the slide 368 is forward and plate 371 counterclockwise, Figure 3, that the total in register 61 is a positive amount and when slide 368 is to the rear and plate 371 clockwise, the register total is negative.

So long as the remainder in register 61 is a positive amount at the end of a cycle, the slide 368 is forward and plate 371 holds an arm 372, Figures 20, 23 and 24, in an upper position. In such upper position a stud 373 on lever 350 passes through a slot 374 in arm 372. This stud 373 is of such length that it is moved into the plane of arm 372 when lever 350 is shifted in division operations to the left of the machine and is at other times clear of arm 372. When the register overdrafts, stud 373 is in slot 374 but the usual spring on arm 369 maintains tension on plate 371 and arm 372 to move arm 372 to a lower position as soon as lever 350 is restored to its normal position.

At the end of this cycle, the counter bar 242 has been raised to position a type 37 one less than the number of cycles which have ensued but as this is one more than the correct number of cycles, the counter bar has been advanced to the correct quotient digit.

*The overdraft correction cycle*

(Figures 19, 23, 24 and 27)

After register 61 overdrafts to a negative remainder, a correction cycle must be taken to restore the remainder to the last positive amount. In this cycle which immediately follows the overdraft cycle, the divisor is added into the register 61 rather than subtracted, the divisor and present quotient digit are printed and the back space key 209 is operated to reduce the set up divisor by a factor of 10.

At the start of this overdraft cycle, arm 372, Figures 23 and 24, has been lowered to place the upper projection 375 in the path of stud 373 of lever 350. Consequently lever 350 cannot during this cycle be driven by lever 237 when lever 237 is freed by roll 240 of plate 241 and lever 237 is blocked in its normal position. Since lever 350 is not permitted to rotate, it does not engage stud 351 of subtraction frame 104 to raise frame 104 and register 61 is then during this cycle engaged with the adding racks 55 for entry of the divisor positively. This will correct the overdraft condition of register 61 and bring the remainder to the last positive remainder.

Also during this cycle, lever 237 being retained in its normal position, is unable to lift link 239, Figure 19, and slide 119 and bar 118 are not moved leftward. The printing and paper feed mechanisms are then effective in this cycle and the divisor and quotient figure on the counter bar will be printed.

Furthermore, because lever 235 is not moved by lever 237, slide 296 is not permited to move forward to advance the counter bar 242 to a higher digit. Since the counter bar 242 was at the correct quotient digit during the prior cycle, there is no need to advance it during this cycle.

Blocking of movement of lever 350 also enables the back space key operating means. It will be remembered that during the preceding cycles, lever 350 was effective to retain lever 357, Figures 23 and 24, in its clockwise position during the time that latch 359 was released from ear 366 of lever 357. In the correction cycle, however, lever 350 is not moved and when latch 359 is released by arm 103, lever 357 is free to rotate counterclockwise to the Figure 24 position and raise the rear end of slide 223 to a position to be engaged by the stud 230 of plate 231. At the end of this cycle, then, slide 223 is forced rearwardly to operate key 209 as has been described and return gate 32 one step. This reduces the set up divisor by a factor of 10 in preparation for the next series of operations. Rearward movement of slide 223 also releases counter bar 242 for restoration to its lowest position as has been described with reference to the multiplication operations.

During the later half of this corrective cycle, the register 61 overdrafts, this time to a positive amount. Such a positive overdrafting would unless prevented raise projection 375 of arm 372 above stud 373 of lever 350. This if permitted would allow lever 350 to restore arm 357 to the ineffective position and prevent operation of slide 223. To retain arm 372 in blocking engagement with stud 373, a latch is provided on lever 350 to retain the arm 372 depressed until the end of the immediate cycle. This latch, Figures 24 and 27, is a small plate 376 pivoted on the lower arm of lever 350, a spring 377 urging the plate to bring a lower arm against stud 373. Plate 376 is formed with a bent off ear 378. During cycles with arm 372 elevated, this ear 378 strikes against the projection 375 of arm 372 and plate 376 rocks about its pivot. When arm 372 is lowered to abut stud 373, the slight movement of lever 350 to take up the clearances moves ear 376 above projection 375 and so retains arm 372 in the lowered position until the end of the cycle when lever 237 is fully restored to its normal position.

*The second quotient digit*

The second and subsequent quotient digits are determined in the same manner as the first digit above described is determined although the divisors are reduced by a factor of 10 for each subsequent quotient digit.

*Automatic division stopping*

(Figures 11, 14 and 28 to 31)

The division operation is stopped in the same manner as the multiplication operation is stopped, that is, by release of the cradles 161 and 328 from latch 166, Figures 11 and 28. It will be recalled that in multiplication the latch 166 is released to permit return of the cradle 161, when the lowest order type bar raises above the zero position and when slide 157 is moved rearwardly. In a division operation, slide 157 is not moved forwardly to blocking position for this is done by a setting of multiplier slide 110. Consequently when the units order type bar 35 moves above "0" in a division operation, shaft 303 is free to rock and lower link 312 into the path of stud 314 of arm 315.

The lowest order type bar 35, however, raises above "0" in each cycle during determination of the lowest quotient digit and, therefore, release of latch 166 must be delayed until the quotient digit has been determined. The quotient digit is determined and printed when a corrective add-back cycle occurs and it is in this additive cycle that latch 166 must be released. A latch is therefore provided to prevent operation of arm 315, Figures 11, 14 and 29 to 31, until the machine is in an addition cycle. This latch comprises a hooked lever 380 pivoted on sliding link 319 and tensioned by a spring 381 to engage its hooked end over the stud 320 when arm 315 is shifted to its forward position. When lever 380 is hooked onto stud 320, arm 315 is prevented from returning to its home position when released by bar 48 and cannot operate link 312 through stud 314. As shown in Figures 11, and 29–31, hook lever 380 is controlled by a stud 382 on a part 383 fixed to stud 77. This member 383 is a part of the linkage for shifting register 61 between the add racks 55, the neutral disengaged position and the subtraction racks 56. When member 383 is in the subtraction position, Figure 31, to which it is moved in division cycles just after the mid cycle position, stud 382 is freed from hook lever 380 and this lever 380 hooks over stud 320 preventing return movement of arm 315. At this time the lowest order type bar has risen above "0" and link 312 is lowered to position end 313 in back of stud 314 on arm 315. The register 61 and member 383 remain in subtractive position until the type bars 35 are all returned to their lowest position and so elevate link 312 to the upper position. On the next cycle, the register 61 moves to the neutral position, Figure 30, at the beginning of the cycle, and stud 382 releases latch 380 from stud 320 to permit arm 315 to return but since the type bars 35 have not yet moved at this time, link 312 is in the raised position and is not operated.

During the add-back cycle, the register 61 and member 383 move to the add position shown in Figure 29 with stud 382 holding hook lever 380 rocked out of engagement with stud 320. Arm 315 is then free to return as rod 48 is raised and as link 312 is lowered at this time, the link 312 will be engaged by stud 314 and moved rearwardly to release cradle latch 166. This will free cradles 161 and 328 and permit their return to normal position restoring division key 325 and allowing clutch wire 181 to return to cycle arresting position. Restoration of multiplier cradle 161 during this cycle enables the restoring mechanism for swinging gate 32 and disables the back space mechanism for key 209 so that the divisor previously set up is destroyed and all parts are restored to their normal condition.

*Error stopping mechanism*

(Figures 11, 16 to 19 and 21)

It may happen that in a division problem, the divisor is not set into pins 33 or it is set up but not properly aligned with the highest dividend order. Under these conditions, there will be no overdraft of register 61 within the first 10 cycles and the quotient digit would remain at 9 or the machine may continue cycling indefinitely. To prevent such erroneous or continued cycling, a mechanism is provided to stop the cycling when the counter bar 242 is raised above the "9" position and to print an "ER" as an error signal. Referring to Figures 16 to 19, during the first 10 division cycles, counter bar 242 is advanced step by step to present the "9" type to the printing hammers. On the 11th subtractive cycle, counter bar 242 is raised past the "9" position to present an "ER" type to the printing point. A lever 386 urged by a spring 387 into engagement with a stud 388 on counter bar 242 follows the counter bar during this movement until when the counter bar 242 moves from "9" to "ER" its upper arm engages an ear 389 on printing control slide 119 which it will be remembered is in the leftmost position at this time. When slide 119 returns to its right hand position at the end of the cycle, the end of the upper arm of lever 386 moves into the path of ear 389 of slide 119.

At the beginning of the next or 12th cycle, roll 240 of plate 241 frees lever 327 but this lever cannot during this cycle rise its full distance since it will be blocked by lever 386 through slide 119, lever 235 and link 239. Subtraction setting bar 350 is also blocked by link 239 so it cannot shift the frame 104 to subtraction. This 12th cycle will then be an addition cycle. A slight movement of levers 235, 237 and 350 will be permitted since a small clearance is provided between lever 386 and ear 389 of slide 119, see Figure 21, and this movement of lever 235 will free ear 282 of slide 276 so that lever 250 will be actuated to operate the counter bar feed pawl 283. When counter bar 242 is in the "ER" position as shown in Figure 18, its lower end is positioned above feed pawl 283 and the pawl 283 moves rearwardly under this lower end and into engagement with a shoulder 390 on an error slide 391, see Figure 11. Slide 391 is movable at its upper end on a fixed stud 392 and is pivoted at its lower end to arm 302 of shaft 303.

As counter bar feed pawl 283 is operated during the 12th cycle, it will pass under the lower end of counter bar 242 and since this end is cut off at an angle to the rear, there will be no movement of bar 242 by pawl 283 but error slide 391 will be elevated by engagement of pawl 283 with its shoulder 390. This movement of slide 391 is transmitted to shaft 303 to rock the shaft counterclockwise and lower arm 312 as has been previously set out. It will be noted that due to the spring connection 308 between shaft 303 and arm 305, shaft 303 may be rocked by error slide 391 even though units order type bar 35 has been arrested at "0" position. Similarly, the shaft 303 can be rocked by slide 391 if slide 157 has been moved forwardly to position nose 300 of the slide 157 over ear 301 of arm 302 on shaft 303 for nose 300 is yieldably held in its obstructing position by a spring 392 connected between nose 302 and slide 157.

Such rocking of shaft 303 will lower projection 313 of link 312 into the path of stud 314 of arm 315 and since this 12th cycle will be an addition cycle due to the blocking of lever 350, arm 315 is free to return when rod 48 goes upwardly in the second half cycle and will actuate link 312 to release the multiplication and division cradles 161 and 328. Release of the cradles at this time will determine that the machine is returned to normal condition and the cycling is ended in the same manner as previously described under the heading of "Automatic division stopping."

*Extended multiplication or division*

(Figures 1, 2, 11 and 14)

During certain multiplication or division operations, it may be desired to use a larger multiplier or obtain more quotient digits than the mechanism so far described is capable of utilizing or computing before the automatic stopping means is effective to arrest computation and clear out the set up values. An extend key 395, Figures 1, 2, 11 and 14 is therefore provided to delay operation of such automatic stopping mechanism to the maximum extent possible.

One common feature of the stopping mechanism for multiplication, division and errors, is that shaft 303, Figure 14, is rocked clockwise to lower link 312. Each of the means for rocking shaft 303 is spring powered, spring 304 for multiplication and division and counter bar feed spring 277 for errors and for this reason, if shaft 303 is positively latched in normal position, these springs will merely fail to operate the shaft 303 and no damage will ensue. Also, since shaft 303 does not rock, the multiplication and division cradles 161 and 328 will not be released, the set-up will not be restored and, in short, the machine will remain in the same condition as it would be at the end of a normal point in the operation rather than an automatic stopping point.

Extend key 395, Figure 14, is connected by a bell crank 396 and a link 397 to a lock lever 398 for shaft 303. Lock lever 398 is tensioned by a spring 399 to an upper ineffective position and holds key 395 in its undepressed position. The rear end of lock lever 398 is formed into a hook and when depressed by key 395 the hook will engage a stud 400 on an arm 401 fixed to the right end of shaft 303, see also Figure 11. This will delay automatic stopping of the machine under control of shaft 303 until key 395 and lever 398 are restored to normal position.

Key 395 and lock lever 398 are retained in their depressed positions by a notched detent 402 urged by a spring 403 into engagement with a stud 404 on an arm 405 fixed to lock lever 398. Detent 402 is released from stud 404 to permit spring 399 to restore key 395 and lock lever 398 to ineffective position by a release lever 406, see Figure 8, which is operated to release detent 402 when gate 32 is back spaced from the tens to the units order position by automatic operation of back space key 209 as above described. Therefore, for extended multiplication or division operations, key 325 will be released when gate 32 is back spaced into the lowest denominational order but as this back spacing is at the very end of the cycle, shaft 303 at this time will be held in normal position by the units order type bar 35 and cradles 161 and 328 will not be released. During the last cycle of the computation of the next multiplier or quotient digit, shaft 303 will be free of latch lever 398 and as the units order type bar must rise in this operation, the automatic release of the cradles 161 and 328 will be effective as above described to stop the machine cycling and clear out the set up values.

It will be noted that in extended multiplication or division as above, when gate 32 is back spaced, the multiplicand or divisor is reduced by a factor of 10. Since there are no fractional digits or sub units orders of either pins 33 or type bars 35, the lowest denominational digits of these factors are successively eliminated. For example, assuming an initial multiplicand or divisor of 4678900000, the successive amounts as a result of the back spacing operations would be 467890000, 46789000, 4678900, 467890, 46789, 4678, 467, 46, and lastly 4. As these last four factors differ from that originally set up in pins 33, the product or quotient and remainder may for some problems be incorrect. In general, however, this inaccuracy is so small as to be negligible and the extended answer will be correct to a greater number of digits than the answer obtainable without this extending feature.

*Predetermined extended quotient*

(Figures 11, 12, 14 and 28)

The disclosed machine is also capable of being operated to extend a quotient in a division problem to a predetermined number of quotient digits more than the number obtained without the extended feature but less than the full capacity of the machine. In this type of operation, multiplier slide 110 is set to a figure representing the number of quotient digits desired. It will be recalled from the description of the multiplying operation, that when slide 157, Figure 12, is moved forwardly as slide 110 is set, its nose 300 moves into the path of arm 302 of shaft 303 to prevent automatic stopping of the machine. This function is utilized in a division operation to extend the division until a predetermined number of quotient digits have been calculated. Prior to the initiation of the division cycling, slide 110 is set by key 109 to the number representing the number of digits desired in the quotient and when so set, nose 300 of slide 157 will prevent rocking of shaft 303 to stop the division at the usual time but not if an error has occurred.

Multiplier slide is returned toward "0" one step as each quotient digit is printed. Feed pawl 268 for slide 110 is normally disabled by arm 174 of yoke 173 and is enabled by division key 325, Figure 28, when the key is depressed. A stud 407 on key 325 contacts, when key 325 is depressed, the right arm 172 of yoke 173 and moves the arm 172 sufficiently to lower shoulder 175 of arm 174 below the path of stud 176 but not far enough to allow the arm 174 to be latched down. Feed pawl 268 is now free to operate on each machine cycle to restore multiplier slide 110 one step toward the "0" position. Pawl 268 is, however, in this type of operation, latched in its normal position by a second latch 408, Figure 28, which drops in front of stud 176 on each subtractive division machine operation.

Lever 408 is connected to a lever 409 running across the front of the machine and having a bent down end 410 in front of an ear 411 of a slide 412. Slide 412 is connected, Figure 14, to the lower arm of lever 350 and will be moved forward each time lever 350 is rocked to set the frame 104 to condition the register 61 for subtraction. Such movement of slide 412 will rock lever 409 to rock lever 408, Figure 28, into blocking position with respect to stud 176 of the feed mechanism for slide 110. When lever 350 is retained against rocking during a corrective add-back cycle during which, as described, the quotient digit is printed, lever 408 is not rocked and feed pawl 268 is free to return slide 110 one step.

Such movement of slide 110 occurs during the first half cycle of the add-back cycle and therefore when the slide is moved into the "0" position in the add-back cycle for the last desired quotient digit, it moves slide 157, Figure 12, to the rear to free shaft 303 to enable automatic division stopping and divisor clearance in the latter half of this add-back cycle. Arm 156 is not effective to prevent rearward movement of slide 157 when slide 110 moves into the "0" position as is the case in multiplication operations for arm 156 is released into blocking position only by the multiplier key 160 and not by the division key 325.

Briefly then, setting of multiplier slide 110 to an advanced position disables the automatic machine stopping controls until the slide 110 has returned to "0" one step for each quotient digit.

*Automatic total taking*

(Figures 1, 2, 6 and 7)

The herein described machine may, if desired, be conditioned to take a total upon completion of either a multiplication or division operation to print the product or the remainder and restore the register 61 to zero. This mechanism is under control of a total lever 415, Figures 1, 2, 6 and 7, which is movable to two positions on a stud 419 and detented in either position by a detent 416 urged into engagement with a stud 417 on total lever 415 by a spring 418. Lever 415 in its rearward clockwise position cams with its arm 420 acting against a stud 421 on link 422, the link 422 slightly toward the front of the machine. In this position of link 422, a plate 423 pivoted on link 422 at 424 and urged counterclockwise by a spring 425 cannot move counterclockwise to engage its shoulder 426 under a pin 427 on the multiplication cradle 161 when cradle 161 is set to an active position. When lever 415 is moved to its forward position, link 422 is, due to the inclined connection of spring 438 with the link 422, moved slightly rearwardly and in such position, when pin 427 is raised by setting of cradle 161, plate 423 can move counterclockwise to bring shoulder 426 under pin 427.

When lever 415 is in its forward position and shoulder 426 is brought under pin 427 by the setting of cradle 161, the parts remain in this position until the last cycle of the multiplication or division operation. During such last cycle, cradle 161 is released for return to normal position by its spring 161a and in such return pin 427 pulls plate 423 and link 422 downwardly to position the rear hooked end of link 422 in the path of a pin 428 on plate 234 fixed to the main shaft 96. Near the end of this cycle which is the last calculating cycle as previously mentioned, pin 428 engages link 422 and moves it rearwardly. Link 422 is pivoted at its front end to a lever 429 free on a stud 430. The other arm of lever 429 is connected by a strong spring 431 to an arm of a bail 432 having another arm over a stud 433 on the non-add key 99. Rearward movement of link 422 by the main shaft 96 as above, acts to depress non-add key 99. Such depression of key 99, when there are no numbers set up in pins 33, initiates, as is fully set out in the aforementioned patents, a total taking operation in two continuous cycles. Plate 423 is released from stud 427 on the first of these cycles by a nose 434 of plate 234 striking an ear 435 of plate 423 to rotate plate 423 sufficiently to move shoulder 426 from under pin 427 and permit spring 438 to return link 422 to its upper position.

Multiplication cradle 161 is always set in any multiplication or division operation and is returned to normal on the last cycle of the operation. When lever 415 is in its forward position, such return of cradle 161 will depress link 422 and enable automatic total operation to follow such last cycle of the calculating operation. Under these conditions the machine will be automatically cleared with all calculating factors printed and in readiness for another calculation.

*Manual stopping of operations*

(Figures 1, 2, 8, 11 and 13)

It is occasionally desired to stop a multiplication or division operation prior to the point at which the automatic stopping operation is initiated and to permit such optional stopping, a stop key 440 is provided. This key 440, Figures 1, 2, 8, 13 is slidable on a stud 441 in the frame and is urged upwardly by a spring 442. A notch 443 in the upper end of key 440 is, when the key is depressed, aligned with a bracket 444 guiding the top of key 440 so that by a rearward movement of the key 440, notch 443 will engage the edge of bracket 444 and the key 440 will be held depressed. A stud 445 is engaged in a slot 446 of a lever 447, depression of key 440 rocking the lever 447 counterclockwise. The rear end of lever 447 overlies an end of a lever 448 which extends across the machine to place its other end under the arm of latch 402 for the extend key 395. Operation of stop key 440 will thus release the extend key 395 if it should be depressed and remove one possible block for automatic stop shaft 303.

The forward end of lever 447 normally rests to the rear of a stud 449 on lever 151 to prevent a rocking of lever 151 past a midposition. Depression of key 440 removes this block on lever 151 and enables lever 151 to swing to its full extent. Lever 151, see Figure 11, is a part of the multiplier digital stopping means and is connected to slide 157. The rear end of slide 157 normally abuts a stud 450 on arm 302 of shaft 303 when multiplier slide 110 is in its "0" position. In multiplication operations, movement of slide 110 to its sub-normal position moves lever 148 but since stud 449 of lever 151 is blocked by lever 447, lever 151 does not move and spring 150 yields. When, however, stop key 440 is depressed, lever 151 is free to move when slide 110 is moved to the sub-normal position and in so moving it moves slide 157 to the rear to engage stud 450 and rock shaft 303 to initiate an automatic stopping operation as has been described. Due to the spring yield between shaft 303 and type bar controlled arm 305, the presence of a "0" in the lowest denominational order type bar 35 is immaterial at this time, spring 150 being strong enough to overcome this resistance.

As has been set out under the description of the multiplying operation, slide 110 is moved into the sub-normal position on the last cycle of the computation with any multiplier digit. Also as set out under the heading "Predetermined extended quotient," the multiplier slide feed pawl 268 is free to feed slide 110 on any corrective add-back cycle. Such a feed of slide 110 is during regular or extended division operations, from the "0" to the sub-normal position. Therefore, after the determination of any quotient digit or the last cycle for any multiplier digit, slide 157 may, if stop key 440 is depressed, be forced rearwardly to institute an automatic stopping of the machine. This stop key 440 is not effective when the machine is set for a predetermined number of quotient digits since slide 110 is not then in its "0" position.

*Manual release of cradles*

(Figure 5)

Should it become necessary at any time to make a correction after the multiplication or division cradles are set to active position, as for example, if one of the multiplication or division keys 160 or 325 are operated with machine power off, the latch for these cradles may be released by the usual correction key 451. This key in addition to its normal function of restoring gate 32 to home position to eliminate any incorrect set up amount, is provided with a cam plate 452, Figure 5, which acts when key 451 is depressed to rock a bail 453 having a stud 454 engaging the edge of plate 452. The right end of this bail 453 has an end overlying a stud 455 on latch 166 for the multiplication and division cradles 161 and 328. Depression of key 451 will then through bail 453 depress latch 166 to free the cradles if they are erroneously set at any time.

*Decimal point printing*

(Figures 3 and 10)

A special key 455 is provided to print a decimal indicator in the multiplier or quotient figures. After all factors of a calculation are computed and the machine cleared, the platen 52 is manually rotated to position the proper decimal location in the multiplier or quotient figures at the printing point and decimal key 455 is depressed. This key 455, Figure 10, is pivotally mounted on a stud 456 and has an upper arm movable when the key 455 is depressed into the path of an ear 457 on the hammer control arm 458 for the counter bar hammer 54. Counter bar 242, it will be recalled, is provided with a type 37 positioned at the printing point when the bar 242 is in its lowest position. This type 37, usually in the form of a "—," is used as a decimal point indication. The arm 458 as shown in Figure 3 is normally free of a stud 459 on the printing hammer 54 and when permitted to rotate counterclockwise in Figure 3, arm 458 will engage stud 459 and prevent printing movement of the hammers 54 when they are released. The upper arm of decimal key 455 will, when the key is depressed, prevent such dropping of arm 458 and enable the hammer 54 to be released at the usual time during the cycle.

Another arm 460 of key 455 extends rearwardly and engages an arm of a bail 461, the other arm of which underlies an ear of link 462, the clutch control link, so that operation of key 455 will institute a machine cycle. As this cycle is a normal additive cycle, there should be no set up value in pins 33 to be entered into register 61.

Key 455 is latched down until after the printing of the decimal indication by a latch plate 463, Figure 10, slidable on a pair of fixed studs 464 and provided with a projection 465 movable over a stud 466 of decimal key 455 when the key is depressed. A spring 467 connected between the key 455 and latch slide 463 serves to urge slide 463 to latching position, key 455 being urged to its normal position by a spring 470. The rear end of slide 463 carries a by-pass pawl 468 pivoted thereon and spring urged counterclockwise into engagement with a stud 469 on the latch 463. During the first half of the cycle, a plate 471 forming a part of the print hammer restoring mechanism and operated from power driven plate 126 on shaft 96 moves past the end of latch 463 and rocks by-pass pawl 468. On the return stroke of plate 471, it engages the pawl 468 to move latch 463 forward to release the decimal key 455 for return to normal position.

*No entry key lock*

(Figures 4 and 10)

A lock is provided for the multiplication and division keys to prevent operation of these keys 160 and 325 if no number has been set up in pins 33. Cycling of the machine without a value set up in the pins is normally a sub-total or total taking operation and would result in damage if such were attempted with the multiplication or division controls set. A lock 475, Figure 4, is provided on a shaft 476 and positioned when no value is set up and gate 32 is in the home position, over an arm of lever 163 connected to the multiplication cradle 161. This lock prevents lever 163 from being moved and so blocks depression of keys 160 or 325, both of which rock lever 163 when depressed. An arm 477, Figure 10, on the other end of shaft 476 is urged rearwardly by a spring 478 to move latch arm 475 from lever 163 and engages the ear 195 of slide 194. Slide 194 is connected to gate 32 and is in its forward position when no value has been set up on the pins 33. When any value key has been operated to move gate 32, slide 194 moves rearwardly to free arm 477 and allow spring 478 to move latch arm 475 to an ineffective position and so free keys 160 and 325 for operation.

*Printing of symbols*

(Figures 3, 4 and 6)

A symbol printing bar 35, Figure 4, similar to the usual type bars is provided to indicate the operation being performed. This bar 35 carries four symbol type—"□," "×," "—" and "CR." During addition cycles this bar 35 rises until an ear 480 on the bottom of the bar abuts a lug 481 depending from subtraction lever 78, the lug 481 being pivoted on lever 78 and biased into the Figure 4 position against a stud 482 on the lever 78 by a spring 483. In this position of the bar 35, the uppermost type is positioned at the printing point but the bar has not risen high enough to block the arm 458, Figure 3, for this print hammer 54 and consequently no symbol will be printed.

In non-add and total operations, the key 99 when depressed moves, by the usual linkage, an arm 484 under stud 485 of the symbol member 458 as in the case of the decimal key 455 to block dropping of arm 458 and permit the hammer 54 to operate. This will print the □ symbol to indicate a non-add or total operation.

When multiplication cradle 161 is set to active position, an arm 486 resting on the stud 165 and connected to a link 487 is free to drop. A spring 488 connected to link 487 moves the link rearwardly when pin 165 is moved away from arm 486 and rocks lug 481 out of the path of ear 480 on the symbol bar 35. Ear 480 then rises during the cycle to abut a shoulder 489 on slide 81 and so positions the "×" symbol type at the printing line. This symbol for multiplication will be printed in each succeeding printing operation so long as cradle 161 remains set.

When division cradle 328 is set along with multiplication cradle 161, the stud 329 on cradle 328 moves into position under lever 486 to hold it in the normal position and the symbol bar 35 in the lowest position. This is the same position as for an addition operation and consequently since printing is done on an add-back cycle, no symbol is printed for division operations.

Slide 81 is the subtraction setting slide and when set to the right in Figure 4, it conditions the machine for subtraction. In this right hand position the lug 481 and shoulder 489 are to the right of the path of ear 480 and symbol type bar 35 raises until the ear 480 abuts the forward end of slide 81 positioning the "CR" type at the printing line. As slide 81 moves to the right on negative total operations, this symbol is utilized for indicating such negative total operations.

Slide 81 moves to the right in subtraction operations also, and unless prevented, symbol type bar 35 would be raised to print "CR" for subtraction operations. To arrest symbol bar 35 at the third or "—" position, a depending arm 490, Figure 6, is pivoted to the main frame and is normally positioned to engage ear 480 and arrest bar 35 at the "—" position to indicate subtraction operations. Depression of the non-add total key 99 as before indicated moves arm 484 under stud 485 on the printing control member 458. A link 491 connected between arm 484 and arm 490 moves arm 490 to a forward position free of ear 480 when key 99 is depressed and if slide 81 is moved rearwardly to control a negative total operation, ear 480 is not arrested until the "CR" type is positioned for printing.

It will be understood that the above specific description is that of a preferred embodiment of the invention and should not be taken in a limiting sense as the novel features can be embodied in similar machines without departing from the spirit of the invention herein set out.

Having described the nature and function of the above preferred embodiment of the invention, what is claimed is:

1. In a printing calculating machine having cycling mechanism, a shiftable value set-up mechanism, a register, means to enter values from said set-up mechanism into said register, and means to shift said value set-up mechanism to alter the denominational relationship of said set-up means and said register, a multiplication control mechanism to enable repeated cycling of said cycling mechanism, said multiplication control mechanism comprising a member settable from a normal position to a plurality of digital value positions, a multiplication key, means operable by said multiplication key to initiate machine cycling, power means controlled by said multiplication key to restore said settable member to its normal position, one step per cycle, latching means to retain said multiplication key operable means in operated condition to cause repeated cycling of said cycling mechanism, and means on said settable member to release said latching means on the movement of said settable member from normal position to a subnormal position.

2. In a printing calculating machine having cycling mechanism, a shiftable value set-up mechanism, a register, means to enter values from said set-up mechanism into said register, and means to shift said value set-up mechanism to alter the denominational relationship of said set-up means and said register, a multiplication control mechanism to enable repeated cycling of said cycling mechanism, said multiplication control mechanism comprising a member settable from a normal position to a plurality of digital value positions, a multiplication key, means operable by said multiplication key to initiate machine cycling, power means controlled by said multiplication key to restore said settable member to its original position, one step per cycle, latching means to retain said multiplication key operable means in operating condition to cause repeated cycling of said cycling mechanism, means on said settable member to release said latching means on the movement of said settable member from normal position to a subnormal position, a counter type bar, value type bars, printing control means, and means positionable by said multiplication key and controlled by said settable member in any digital value position to disable said printing control means.

3. In a printing calculating machine having cycling mechanism, a shiftable value set-up mechanism, a register, means to enter values from said set-up mechanism into said register, and means to shift said value set-up mechanism to alter the denominational relationship of said set-up means and said register, a multiplication control mechanism to enable repeated cycling of said cycling mechanism, said multiplication control mechanism comprising a member settable from a normal position to a plurality of digital value positions, a multiplication key, means operable by said multiplication key to initiate machine cycling, power means controlled by said multiplication key to restore said settable member to its original position, one step per cycle, latching means to retain said multiplication key operable means in operated condition to cause repeated cycling of said cycling mechanism, means on said settable member to release said latching means on the movement of said settable member from normal position to a subnormal position, a counter type bar, value type bars, printing control means, means positionable by said multiplication key and controlled by said settable member in any digital value position to disable said printing control means, normally disabled power means to operate said value set-up shifting means and means operable by said settable member in its subnormal position and controlled by said multiplication key positionable means to enable said value shifting means.

4. In a printing calculating machine having cycling mechanism, a shiftable value set-up mechanism, a register, means to enter values from said set-up mechanism into said register, and means to shift said value set-up mechanism to alter the denominational relationship of said set-up means and said register, a multiplication control mechanism to enable repeated cycling of said cycling mechanism, said multiplication control mechanism comprising a member settable from a normal position to a plurality of digital value positions, a multiplication key, means operable by said multiplication key to initiate machine cycling, power means controlled by said multiplication key to restore said settable member to its original position, one step per cycle, latching means to retain said multiplication key operable means in operated condition to cause repeated cycling of said cycling mechanisms, means on said settable member to release said latching means on the movement of said settable member from normal position to a subnormal position, a counter type bar, value type bars, printing control means, means positionable by said multiplication key and controlled by said settable member in any digital value position to disable said printing control means, power-operated means to advance said counter type bar one step for each machine cycle and retain said bar in the advanced position, and means controlled by said multiplication key positionable means to enable said counter type bar advancing and retaining means.

5. In a printing calculating machine having cycling mechanism, a shiftable value set-up mechanism, a register, means to enter values from said set-up mechanism into said register, and means to shift said value set-up mechanism to alter the denominational relationship of said set-up means and said register, a multiplication control mechanism to enable repeated cycling of said cycling mechanism, said multiplication control mechanism comprising a member settable from a normal position to a plurality of digital value positions, a multiplication key, means operable by said multiplication key to initiate machine cycling, power means controlled by said multiplication key to restore said settable member to its original position, one step per cycle, latching means to retain said multiplication key operable means in operated condition to cause repeated cycling of said cycling mechanism, means on said settable member to release said latching means on the movement of said settable member from normal position to a subnormal position, a counter type bar, value type bars, printing control means, means positionable by said multiplication key and controlled by said settable member in any digital value position to disable said printing control means, normally disabled power means to operate said value set-up shifting means, means operable by said settable member in its subnormal position and controlled by said multiplication key positionable means to enable said value shifting means, power-operated means to advance said counter type bar one step for each machine cycle and retain said bar in the advance position, means controlled by said multiplication key positionable means to enable said counter type bar advancing and retaining means, and means whereby said normally disabled value set-up shifting means when operated restores said power-operated advancing means to a non-retaining position to permit restoration of said counter type bar.

6. In a printing calculating machine having cycling means, cycle initiating means, shiftable value set-up means, a register, means controlled by said set-up means to enter said set-up values into said register, means operable to shift the denominational relationship between said set-up means and said register, means to restore said value set-up means to a normal condition, type bars controlled by said value set-up mechanism, and printing means to determine printing of the values set-up on said type bars, a multiplier control member settable from a normal position to a plurality of digital value positions, normally inoperable means to restore said multiplier control member to normal position and from normal position to a subnormal position, one step for each cycle, a multiplication key, means operable by said multiplication key to operate said cycle initiating means, means settable by said multiplication key to disable said value set-up restoring means and release said value set-up shifting means, a latch controlled by said multiplier control member to retain said cycle initiating means in operated position, said latch releasable by said multiplier control member in subnormal position, means operable by said multiplier control member in subnormal position to enable said value set-up shifting means, means to restore said multiplication key operable means to an unoperated position to disable said value-set-up shifting means and enable said value-set-up restoring means and a linkage released by said multiplier control member in its subnormal position and by the type bar of lowest denominational order in its movement above a "0" position to position said restoring means for said multiplication key operable means for operation by said cycling means.

7. In a printing calculating machine having cycling mechanism, cycle initiating means, value set-up means, a register, entering means to transfer values from said set-up means to said register, value set-up shifting means, value set-up restoring means, a multiplier control member settable from a normal position to a plurality of digital value positions, cyclically operated means to restore, one step per cycle, said multiplier control member from any position to a subnormal position, a multiplication key, means operated by said multiplication key to initiate a machine cycle, means to retain said cycle initiating means in operated position, said means releasable by said multiplier control member in subnormal position, a member set by said multiplication key to disable said value set-up restoring mechanism and to free said value set-up shifting means for control by said multiplier control member, normally disabled cyclically operable means to restore said multiplication key set member, and a member jointly controlled by said multiplier control member and by the value entering means of lowest denominational order to enable said cyclically operable restoring means.

8. In a printing calculating machine having cycling means, cycle initiating means, shiftable value set-up means, value set-up restoring means, value set-up shifting means, settable multiplication control mechanism including a disabling means for said value set-up restoring means and a multiplier control member shiftable from a normal to a plurality of digital value positions and shiftable by said cycling means from any position, step by step to a subnormal position, a plurality of type bars controlled by said value set-up means, mean operative under control of said multiplier control member in its subnormal position to operate said value set-up shifting means and means operative under joint control of said multiplier control member and one of said type bars to restore said settable multiplication control mechanism and thereby enable said value set-up restoring means.

9. A printing calculator mechanism comprising a value set-up means, an algebraic register, entering means to enter values from said set-up means into said register, means to shift the relationship of said value set-up means and said entering means, means to determine whether said register shall receive said entered amounts additively or subtractively, division control means settable to control said addition-subtraction determining means for subtractive entry of said set-up value into said register, and to enable said shifting means for said set-up means, means controlled by said addition-subtraction determining means when in subtractive condition to disable said shifting means and means controlled by said register when the amount therein is a negative remainder to prevent movement of said addition-subtraction determining means to subtractive condition whereby the set-up value will be entered additively into said register and said shifting means will be enabled to shift said value set-up means.

10. A printing calculator mechanism comprising a value set-up means, an algebraic register, entering means to enter values from said set-up means into said register, means to shift the relationship of said value set-up means and said entering means, means to determine whether said register shall receive said entered amounts additively or subtractively, division control means settable to control said addition-subtraction determining means for subtractive entry of said set-up value into said register, and to enable said shifting means for said set-up means, means controlled by said addition-subtraction determining means when in subtractive condition to disable said shifting means, means controlled by said register when the amount therein is a negative remainder to prevent movement of said addition-subtraction determining means to subtractive condition whereby the set-up value will be entered additively into said register and said shifting means will be enabled to shift said value set-up means, a plurality of type bars controlled by said value set-up means, a counter type bar, means to prevent printing from said type bars, means operated by said division control means, when set, to advance said counter type bar to successively higher positions for each operation of the machine, means operable by said value set-up shifting means to determine restoration of said counter type bar to normal position, and means operated by said addition-subtraction determining means when in subtractive condition to enable said printing preventing means.

11. A printing calculator mechanism comprising a value set-up means, an algebraic register, entering means to enter values from said set-up means into said register, means to shift the relationship of said value set-up means and said entering means, means to determine whether said register shall receive said entered amounts additively or subtractively, division control means settable to control said addition-subtraction determining means for subtractive entry of said set-up value into said register, and to enable said shifting means for said set-up means, means controlled by said addition-subtraction determining means when in subtractive condition to disable said shifting means, means controlled by said register when the amount therein is a negative remainder to prevent movement of said addition-subtraction determining means to subtractive condition whereby the set-up value will be entered additively into said register and said shifting means will be enable to shift said value set-up means, a plurality of type bars controlled by said value set-up means, a counter type bar, means to prevent printing from said type bars, means operated by said division control means, when set, to advance said counter type bar to successively higher positions for each operation of the machine, means operable by said value set-up shifting means to determine restoration of said counter type bar to normal position, means operated by said addition-subtraction determining means when in subtractive condition to enable said printing preventing means, means controlled by one of said type bars to restore said division control means to normal position and means controlled by said register to delay effective operation of said division control restoring means until said register is in an additive condition.

12. A printing calculator mechanism comprising a value set-up means, an algebraic register, entering means to enter values from said set-up means into said register, means to shift the relationship of said value set-up means and said entering means, means to determine whether said register shall receive said entered amounts additively or subtractively, division control means settable to control said addition-subtraction determining means for subtractive entry of said set-up value into said register, and to enable said shifting means for said set-up means, means controlled by said addition-subtraction determining means when in subtractive condition to disable said shifting means, means controlled by said register when the amount therein is a negative remainder to prevent movement of said addition-subtraction determining means to subtractive condition whereby the set-up value will be entered additively into said register and said shifting means will be enabled to shift said value set-up means, a plurality of type bars controlled by said value set-up means, a counter type bar, means to prevent printing from said type bars, means operated by said division control means when set to advance said counter type bar to successively higher positions for each operation of the machine, means operable by said value set-up shifting means to determine restoration of said counter type bar to normal position, means operated by said addition-subtraction determining means when in subtractive condition to enable said printing preventing means, means controlled jointly by said register and by one of said type bars to restore said division control means to normal position and manual means to prevent operation of said division control restoring means.

13. A printing calculator mechanism comprising a value set-up means, an algebraic register, entering means to enter values from said set-up means into said register, means to shift the relationship of said value set-up means and said entering means, means to determine whether said register shall receive said entered amounts additively or subtractively, division control means settable to control said addition-subtraction determining means for subtractive entry of said set-up value into said register, and to enable said shifting means for said set-up means, means controlled by said addition-subtraction determining means when in subtractive condition to disable said shifting means, means controlled by said register when the amount therein is a negative remainder to prevent movement of said addition-subtraction determining means to subtractive condition whereby the set-up value will be entered additively into said register and said shifting means will be enabled to shift said value set-up means, a plurality of type bars controlled by said value set-up means, a counter type bar, means to prevent printing from said type bars, means operated by said division control means, when set, to advance said counter type bar to successively higher positions for each operation of the machine, means operable by said value set-up shifting means to determine restoration of said counter type bar to normal position, means operated by said addition-subtraction determining means when in subtractive condition to enable said printing preventing means, means controlled jointly by said register and by one of said type bars to restore said division control means to normal position, a control member movable from a normal position to a plurality of advanced positions, means controlled by said addition-subtraction determining means to restore said control member one step toward normal position on each additive machine cycle, means to prevent operation of said division control restoring means and a connection from said control member to said operation preventing means to disable said operation preventing means when said control member is in the normal position.

14. A printing calculating machine having cycling mechanism, cycle initiating mechanism, shiftable value set-up means, means to shift said value set-up means, an algebraic register, entering means to transfer values from the set-up means to said register, means to determine whether said values shall be entered additively or subtractively in said register, a shiftable member operable by power, when shifted, to position said determining means in subtraction determining condition, a plurality of type bars settable by said value set-up means, a counter type bar, and printing means to print the values set up on all of said type bars, a division control mechanism settable to operate said cycle initiating means, to release said shifting means for said value set-up means, to shift said shiftable subtraction member into operable position, and to enable a cyclically operated counter type bar advancing and retaining mechanism, means operable by said shiftable subtraction member when operated to disable said shifting means for said value set-up means and to disable said printing means, means operable by said register when the remainder in said register is a negative quantity to prevent operation of said shiftable subtraction member and thereby enable said value set-up shifting means and said printing means and retain said addition-subtraction determining means in addition position, and means operable during said addition cycle to restore said counter type bar to normal position.

15. In a printing calculating machine having cycling mechanism, a shiftable value set-up mechanism, an algebraic register, entering mechanism for said register to transfer values thereto from said value set-up mechanism, and subtraction control mechanism operable to determine a transfer of said values to said register in a subtractive sense, division control means settable to determine operation of said cycling mechanism, a latch retaining said division control means in set position, a cyclically operating arm settable by said division control means into a position wherein it operates said subtraction control mechanism, means operated by said register when a negative total is contained therein to block said cyclically operating arm to determine an additive entry of said set-up value, a cyclically operating power means, a latch release arm for said division control latch, means operated by a portion of said entering mechanism when a value greater than "0" is being entered thereby to shift said latch release arm into engagement with said cyclically operating power means and a lock lever positioned by said register to prevent release of said power means while said register is receiving an entry in the subtractive sense.

16. In a printing calculating machine having cycling mechanism, shiftable value set-up mechanism, a register, and entering mechanism for the register to transfer values from the set-up mechanism to the register, division control means settable to initiate cycling of said machine, and to determine subtractive operation of said register, means operated by said register when a negative total is contained therein to control an additive entry of said set-up value and to enable a shift of said value set-up means, power means controlled by said entering mechanism and by said register to release said division control means for return to normal condition, an extended operation key depressible to prevent operation of said releasing means for said division control means and means controlled by said shiftable value set-up means when shifted to a predetermined position, to release said extended operation key for return to normal position whereupon said releasing means for said division control means may again be controlled by said register and said entering means.

17. In a printing calculating machine having cycling mechanism, shiftable value set-up mechanism, a register, and entering mechanism for the register to transfer values from the set-up mechanism to the register, division control means settable to initiate cycling of said machine, and to determine subtractive operation of said register, means operated by said register when a negative total is contained therein to control an additive entry of said set-up value and to enable a shift of said value set-up means, power means controlled by said entering mechanism and by said register to release said division control means for return to normal condition, and means to prevent release of said division control means comprising a blocking member for said releasing means, a control member movable from a normal position wherein it restrains said blocking member to a plurality of advanced positions wherein said blocking member is released to move to blocking position, and means to move said control member one step toward normal position during each cycle of the machine in which the set-up value is entered additively into said register.

18. A printing calculating machine comprising cycling means, value set-up mechanism, an algebraic register, entering means to transfer values from the set-up mechanism to the register, means to determine whether such set-up value shall be entered additively or subtractively into said register, operation control means shiftable to control machine functions, a holding means for said operation control means, means normally operative under control of said register when a value is entered additively into said register and of said entering means to release said holding means, a cycle counter bar, means to advance said bar one step for each machine cycle, means operated by said bar in a predetermined position to control additive entry of said set-up value into said register, and means operated by said counter bar advancing means when said counter bar is in said predetermined position to control operation of the releasing means for said operation control holding means.

19. A printing calculating machine having cycling means, value set-up means, a register and value entering means for said register, operation control means operable to initiate cycling of said cycling means, means operable when said register is in a predetermined position and under control of said entering means to return said operation control means to an unoperated position, a counter bar, advancing means for said counter bar, means controlled by said counter bar in a predetermined position thereof, and operated by said cycling means to move said register to said predetermined position and means operated by said counter bar advancing means when said counter bar is in said predetermined position, to control said returning means for said operation control means irrespective of the control of said returning means by said entering means.

20. A printing calculating machine capable of multiplication and division operations comprising a shiftable value set-up mechanism, an algebraic register, value entering means to transfer values additively or subtractively from said value set-up mechanism to said register, printing mechanisms, and settable operation controlling mechanisms for multiplication and division operations including a value set-up slide movable from a normal to a plurality of digital positions, means to restore said operation controlling mechanisms to normal position, means controlled by said value set-up slide, said register, and said entering means to restore said operation controlling means, manually settable means to prevent operation of said restoring means for said operation controlling means and mechanism operated by said shiftable value set-up means in a predetermined position thereof to release said manually settable means for return to normal position whereby said controlled means is again rendered operable to restore said operation controlling means.

21. A printing calculating machine for operations including multiplication and division operations having power means, shiftable value set-up means, a register movable into addition and subtraction positions, entering means controlled by said value set-up means to enter the set-up values into the register, manually settable operation controlling means for conditioning said register, said entering means, said value set-up means and said power means for multiple cycle operations, said operation controlling means including a manually settable member, and means to restore said member to a normal position, a power-operated member, a link operable by said power-operated member to restore said manually settable operation controlling means to normal position, means controlled by said entering means and said manually settable member to engage said link with said power-operated member for operation thereby, means controlled by said register while in subtractive position to prevent operation of said power-operated member while said link is engaged therewith, a settable extended calculation key, means operated by said key to retain said means controlled by said entering means and said manually settable member in link disengaging position and means under control of said value set-up means to restore said settable extended calculation key.

22. A printing calculating machine for operations including multiplication and division operations having power means, shiftable value set-up means, a register movable into addition and subtraction positions, entering means controlled by said value set-up means to enter the set-up values into the register, manually settable operation controlling means for conditioning said register, said entering means, said value set-up means and said power means for multiple cycle operations, said operation controlling means including a manually settable member, power-operated means to move said manually settable member from a normal to a subnormal position, a power-operated member, a link operable by said power-operated member to restore said manually settable operation controlling means to normal position, means to engage said link with said power-operated member for operation thereby, means controlled by said register while in subtractive position to prevent operation of said power-operated member while said link is engaged therewith, normally inoperative means tensioned by said manually settable member when moved from normal to subnormal position to operate said link engaging means, a blocking means for said normally inoperative means, and a manually settable operation stopping key to remove said blocking means.

23. A printing calculating machine having a register, value set-up means, means including type bars to transfer values from said set-up means to said register and settable under control of said register in a total-taking operation, power means for operating said machine, function controlling means including a part settable in multiplication and division operations, a total control member operable to initiate a total-taking operation of said machine, means to operate said total control member, and a releasable conection between said settable part of said function controlling means and said total control member operating means to engage said operating means with said power means on return of said settable part from set to normal position.

24. A printing calculating machine having a register, value set-up means, means including type bars to transfer values from said set-up means to said register and settable under control of said register in a total-taking operation, power means for operating said machine, function controlling means including a part settable in multiplication and division operations, a total control member operable to initiate a total-taking operation of said machine, means to operate said total control member, a releasable connection between said settable part of said function controlling means and said total control member operating means to engage said operating means with said power means on return of said settable part from set to normal position, and a member manually settable to two positions, said member in one of said positions releasing said connection between said settable part and said total control member operating means.

25. A printing calculating machine having cycling means, value set-up means, an algebraic register, means to enter values from said value set-up means into said register, division control means to condition said machine for a division operation, a transfer mechanism for said register including a "fugitive one" mechanism to transfer a unit from the highest to the lowest denominational order of said register and means controlled by said division control means when operated to condition said machine for a division operation, to prevent entry of said unit into said lowest denominational order of said register.

26. A printing calculating machine having cycling means, value set-up means, an algebraic register, means to enter values from said value set-up means into said register, division control means to condition said machine for a division operation, a "fugitive one" mechanism for said register including a member operable by the highest denominational order of said register to permit an extra unit movement of the value entering means for the lowest denominational order of said register, and means controlled by said division control means in a division operation to prevent such extra unit movement of said lowest denominational value entering means.

27. A printing calculating machine having an algebraic register, value set-up means, an entering mechanism to enter values from said set-up means additively or subtractively in said register, said entering mechanism including rack bars movable to enter said values into said register, a "fugitive one" mechanism controlled by the highest denominational order of said register to free said rack bar of lowest denominational order for an extra unit of entering movement, function control means settable to condition said machine for a division operation, and means operated by said function control means to prevent such extra unit of entering movement of said rack bar so long as said function control means remains in set position.

28. In a printing calculating machine having cycling mechanism, function control means, a counter bar, means to advance said counter bar one step for each machine cycle comprising a shaft, a feed pawl and a detent pawl for said counter bar, said pawls normally restrained free of said counter bar by said shaft, a connection from said shaft to said cycling mechanism to return said shaft to the normal position during each machine cycle, a cyclically operating member normally restrained but operable to move said shaft through a lost motion connection, and means operated by said function control means to release said connection between said shaft and said cycling mechanism and to free said cyclically operating member, said operating member acting during a machine cycle to move said shaft to a full position to enable said detent pawl and to operate said feed pawl to advance said counter bar and restoring said shaft to an intermediate position wherein said detent pawl remains effective.

29. In a printing calculating machine having cycling mechanism, function control means, and a counter bar, means to advance said counter bar one step for each machine cycle comprising a shaft, a feed pawl and a detent pawl for said counter bar, said pawls normally restrained free of said counter bar by said shaft, a connection from said shaft to said cycling mechanism to return said shaft to the normal position during each machine cycle, a cyclically operating member normally restrained but operable to move said shaft through a lost motion connection, means operated by said function control means to release said connection between said shaft and said cycling mechanism and to free said cyclically operating member, said operating member acting during a machine cycle to move said shaft to a full position to enable said detent pawl and to operate said feed pawl to advance said counter bar and restoring said shaft to an intermediate position wherein said detent pawl remains effective, a shiftable value set-up means, mechanism controlled by said function control means to shift said value set-up means and means operated by said shifting mechanism for said value set-up means to restore said shaft to the normal position to free both of said pawls from said counter bar.

30. In an adding and subtracting machine having a register capable of representing positive and negative amounts, and an index member settable into either of two positions as an incident to a change in the character of said amounts for indicating the character of said amounts, in combination, means for initiating a division operation, a normally ineffective control device capable of sensing said index member for conditioning machine functions during division, and means controlled by said initiating means for permitting said control device to sense said index member substantially at the beginning of each division cycle, one species of machine functions being conditioned in said cycle when said index member is in a position corresponding to a positive amount and another species of machine functions being conditioned in said cycle when said index member is in a position corresponding to a negative amount.

31. In a printing calculating machine wherein problems in division may be executed by first adding the dividend into the accumulator and then repeatedly subtracting out the divisor in continuous and consecutive machine operations, the combination of a main operating mechanism, printing mechanism including a special type carrier standing normally out of printing range, a division key, means operated by said division key for conditioning said calculating machine for division, means operable when said machine is conditioned for division for advancing said special type carrier one step on each cycle of said main operating mechanism, and means positioned by said special type carrier advancing means for operation by said main operating mechanism to restore said conditioning means to normal ineffective position after said carrier is advanced to a predetermined position.

32. In a printing calculating machine wherein problems in division may be executed by first adding a dividend and thereafter repeatedly subtracting out a divisor until the machine overdrafts, adding back the divisor and continuing subtracting the divisor in a lower denominational order, the combination of a main operating mechanism, a printing member having digit type thereon said digit type being normally out of printing alignment, a division key mechanism settable to condition said machine for division operations, a printing member advancing mechanism operable under control of said division key mechanism to advance said printing member one step in each cycle of said main operating mechanism, a device operable by said main operating mechanism to restore said division key mechanism and means operable by said advancing mechanism when said printing member is in a predetermined position to position said device for operation by said main operating mechanism.

33. In a printing calculating machine wherein problems in division may be executed by first adding a dividend and there after repeatedly subtracting out a divisor until the machine overdrafts, adding back said divisor and continuing subtraction of the divisor in a lower denominational order, the combination of a main operating mechanism, a printing member having digit type thereon said digit type being normally out of printing alignment, a division key mechanism settable to condition said machine for division operations, a printing member advancing mechanism operable under control of said division key mechanism to advance said printing member one step in each cycle of said main operating mechanism, division key mechanism restoring means operable by said main operating mechanism but normally in an ineffective position, a slide driven by said printing member advancing means when said printing member is in a predetermined position, and members operable by said slide when driven to shift said restoring means to an effective position with respect to said main operating mechanism.

34. In a machine of the class described having a register capable of algebraic summation of items entered therein, an index member controlled by said register and settable into either of two positions to represent the positive or negative character of a value present in said register, a control device to determine positive or negative entry of an item into said register and cycling means to operate said machine, the combination of division control mechanism, a member released by operation of said division control mechanism for cyclic operation by said cycling means to position said control device for negative item entries and an abutment on said member engageable with said index member when said index member is in the position representing a negative register value to prevent said member from moving said control device to the negative entry position.

35. In a calculating machine of the class described having a cycling means, a value set-up means, an algebraic register, means to enter values from said set-up means into said register and a "fugitive one" mechanism for said register including a member operable by the highest denominational order of said register to control entry by said entering means of an additional unit into the lowest denominational order of said register, the combination of a division operation control means, an element settable by said division operation control means for operation by said cycling means and mechanism connected to said settable element to prevent entry of said additional unit into said register while said division operation control means is effective.

36. In a calculating machine of the class described having a cycling means, a value set-up means, an algebraic register, means to enter values from said set-up means into said register and a "fugitive one" mechanism operable under control of said register to enable entry by said entering means of an extra unit value into the lowest denominational order of said register, the combination of a division control means, a member shiftable from a normal to a division position by said division control means, a two position lever pivoted on said member, said lever being adjusted from a first to a second position by said cycling means in accordance with the normal or division positions respectively of said shiftable member and a linkage connected to said lever to prevent entry of said extra unit value by said entering means while said lever is in said second position during division operations.

References Cited in the file of this patent

UNITED STATES PATENTS

| Number | Name | Date |
|---|---|---|
| Re. 22,947 | Clary | Dec. 9, 1947 |
| 1,033,109 | Lundgren | July 23, 1912 |
| 2,237,881 | Landsiedel | Apr. 8, 1941 |
| 2,255,622 | Landsiedel | Sept. 9, 1941 |
| 2,297,243 | Pott | Sept. 2, 1942 |
| 2,339,616 | Chase | Jan. 18, 1944 |
| 2,397,745 | Kiel | Apr. 2, 1946 |